United States Patent
Kim et al.

(10) Patent No.: US 11,360,620 B2
(45) Date of Patent: Jun. 14, 2022

(54) TOUCH DISPLAY DEVICE AND TOUCH DRIVING CIRCUIT

(71) Applicant: LG Display Co., Ltd., Seoul (KR)

(72) Inventors: KiYong Kim, Gyeonggi-do (KR); HyeongWon Kang, Seoul (KR); Youngwoo Jo, Paju-si (KR); HongJu Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 231 days.

(21) Appl. No.: 16/712,015

(22) Filed: Dec. 12, 2019

(65) Prior Publication Data

US 2020/0210022 A1 Jul. 2, 2020

(30) Foreign Application Priority Data

Dec. 27, 2018 (KR) .................. 10-2018-0170619

(51) Int. Cl.
*G06F 3/044* (2006.01)
(52) U.S. Cl.
CPC .................. *G06F 3/0443* (2019.05)
(58) Field of Classification Search
CPC .. G06F 3/0443; G06F 3/04184; G06F 3/0418; G06F 3/04166; G06F 3/0446; G06F 3/0416; G06F 3/0412; G06F 3/044; G06F 2203/04104; G06F 2203/04106
See application file for complete search history.

(56) References Cited

U.S. PATENT DOCUMENTS

| | | | |
|---|---|---|---|
| 2015/0185913 A1* | 7/2015 | Han | G06F 3/0418 345/174 |
| 2016/0224177 A1* | 8/2016 | Krah | G06F 3/0412 |
| 2019/0064999 A1* | 2/2019 | Kang | G06F 3/044 |
| 2019/0102004 A1* | 4/2019 | Krah | G06F 3/041662 |

* cited by examiner

*Primary Examiner* — Kent W Chang
*Assistant Examiner* — Andrew Lee
(74) *Attorney, Agent, or Firm* — Morgan, Lewis & Bockius LLP

(57) ABSTRACT

A touch display device includes: a touch panel including N touch electrodes; a sensor sensing unit block including M sensor sensing units and to sense two or more touch electrodes among the N touch electrodes; a front multiplexer to select two or more touch electrodes from among the N touch electrodes and connect the selected touch electrodes to the sensor sensing unit block. The front multiplexer is configured to select M touch electrodes, which are disposed in a sensing active region corresponding to a first sensing period, from among the N touch electrodes, and to match and connect the M touch electrodes to the M sensor sensing units, wherein M is greater than or equal to 2, and N is greater than M. The M sensor sensing units are configured to simultaneously sense the M touch electrodes disposed in the sensing active region during the first sensing period.

17 Claims, 37 Drawing Sheets

*FIG.13*

MUX2 #j + MUX3 #j (j=1, 2, ⋯, M)

| | 1st Sensing Time | 2nd Sensing Time |
|---|---|---|
| 1st Case | S1, S2 : ON<br>S3, S4 : OFF<br>S5, S6 : OFF<br>Sa, Sb : ON<br>Sc, Sd : OFF | S1, S2 : OFF<br>S3, S4 : ON<br>S5, S6 : OFF<br>Sa, Sb : ON<br>Sc, Sd : OFF |
| 2nd Case | S1, S2 : OFF<br>S3, S4 : OFF<br>S5, S6 : ON<br>Sa, Sb : ON<br>Sc, Sd : OFF | S1, S2 : OFF<br>S3, S4 : OFF<br>S5, S6 : ON<br>Sa, Sb : OFF<br>Sc, Sd : ON (Polarity 반전) |

TOUCH DISPLAY DEVICE AND TOUCH DRIVING CIRCUIT

CROSS REFERENCE TO RELATED APPLICATION

This application claims priority from Korean Patent Application No. 10-2018-0170619, filed on Dec. 27, 2018, which is hereby incorporated by reference for all purposes as if fully set forth herein.

BACKGROUND

1. Technical Field

The present disclosure relates to a touch display device and a touch driving circuit.

2. Discussion of the Related Art

A touch display device may provide a touch-based input function which enables a user to easily, intuitively, and conveniently input information or commands, in addition to a function of displaying a video or an image.

In order to provide the touch-based input function, the touch display device is required to recognize whether a user touch exists, and to accurately sense touch coordinates. To this end, the touch display device may include a touch panel provided in a touch sensor structure.

In order to perform touch sensing, a large number of touch electrodes may be disposed in a touch panel. As described above, although a large number of touch electrodes are required, the number of channels of a touch driving circuit for sensing a touch panel may be limited due to many limitations. Therefore, to enable a touch driving circuit having a limited number of channels to sense a large number of touch electrodes disposed in a touch panel, a multiplexer is required, which is used for selectively connecting some of the touch electrodes disposed in the touch panel to the touch driving circuit.

Along with asymmetry between the number of touch electrodes and the number of channels of the touch driving circuit, a driving timing for sensing a large number of touch electrodes may need to be elaborately controlled. Due to this, it is very difficult to develop a multiplexer that performs normal and effective operations.

SUMMARY

Accordingly, embodiments of the present disclosure are directed to a touch display device and a touch driving circuit that substantially obviate one or more of the problems due to limitations and disadvantages of the related art.

An aspect of the present disclosure is to provide a multiplexer that allows effective touch driving, a touch display device including the multiplexer, and a touch driving circuit.

Another aspect of the present disclosure is to provide a multiplexer that allows simultaneous sensing of touch electrodes disposed in a predetermined region during a predetermined sensing time, a touch display device including the multiplexer, and a touch driving circuit.

Also, another aspect of the present disclosure is to provide a multiplexer that allows effective and various changes of a region which may be simultaneously sensed according to a sensing time, a touch display device including the multiplexer, and a touch driving circuit.

Also, another aspect of the present disclosure is to provide a multiplexer suitable for a differential sensing scheme, a touch display device including the multiplexer, and a touch driving circuit.

Also, another aspect of the present disclosure is to provide a multiplexer suitable for a simultaneous driving scheme that simultaneously performs display driving and touch driving, a touch display device including the multiplexer, and a touch driving circuit.

Also, another aspect of the present disclosure is to provide a multiplexer that is capable of changing, in units of lines, a region which may be simultaneously sensed according to a sensing time, a touch display device including the multiplexer, and a touch driving circuit.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a touch display device comprises: a touch panel including N touch electrodes; a sensor sensing unit block configured to sense two or more touch electrodes among the N touch electrodes; and a front multiplexer configured to select the two or more touch electrodes among the N touch electrodes and connect the selected touch electrodes to the sensor sensing unit block.

The sensor sensing unit block may include M sensor sensing units.

M is greater than or equal to 2, and N is greater than M.

The front multiplexer is configured to select M touch electrodes, which are disposed in a sensing active region corresponding to a first sensing period, from among the N touch electrodes, and to match and connect the M touch electrodes to the M sensor sensing units.

The M sensor sensing units are configured to simultaneously sense the M touch electrodes disposed in the sensing active region during the first sensing period.

Each of the M sensor sensing units may include a differential amplifier having a sensing input end and a reference input end.

The front multiplexer is configured to: select the M touch electrodes disposed in the sensing active region from among the N touch electrodes, as M sensing electrodes; further select other M touch electrodes from among N-M touch electrodes remaining after excluding the M touch electrodes from the N touch electrodes, as M reference electrodes; connect each of the M sensing electrodes to a sensing input end of the differential amplifier of each of the M sensor sensing units; and connect each of the M reference electrodes to a reference input end of the differential amplifier of each of the M sensor sensing units.

The differential amplifier of each of the M sensor sensing units differentially amplifies a first input signal and a second input signal, which are input from a corresponding sensing electrode and a corresponding reference electrode, respectively. The front multiplexer may include: a first-multiplexer configured to select the 2M touch electrodes from among the N touch electrodes, and to set a differential sensing region; M second-multiplexers corresponding to the M sensor sensing units, and configured to group the 2M touch electrodes into M touch electrode pairs; and M third-multiplexers corresponding to the M sensor sensing units, and configured to connect two touch electrodes included in each of the M touch electrode pairs to a sensing input end and a reference input end of a differential amplifier included in each of the M sensor sensing units.

The first-multiplexer is configured to select the 2M touch electrodes from among the N touch electrodes, and to provide a load-free driving signal to touch electrodes remaining after excluding the 2M touch electrodes from the N touch electrodes.

When grouping the 2M touch electrodes into the M touch electrode pairs, the M second-multiplexers may group two touch electrodes, disposed to be adjacent to each other, into a single touch electrode pair.

When grouping the 2M touch electrodes into the M touch electrode pairs, the M second-multiplexers may group two touch electrodes, disposed to be spaced apart from each other, into a single touch electrode pair. Each of the M second-multiplexers may include: a first switch and a second switch which group a first touch electrode and a second touch electrode adjacent to the first touch electrode, at a first sensing timing; and a third switch and a fourth switch which group the second touch electrode and a third touch electrode adjacent to the second touch electrode, at a second sensing timing.

Each of the M second-multiplexers may include a fifth switch and a sixth switch which group a first touch electrode and a second touch electrode which is spaced one or more touch electrodes apart from the first touch electrode. Each of the M third-multiplexers may include four polarity assignment switches which selectively connect two touch electrodes included in each of the M touch electrode pairs to a sensing input end and a reference input end of a differential amplifier of a corresponding sensor sensing unit.

The touch panel may include a plurality of touch electrode rows.

The sensing active region may include H touch electrode rows from among the plurality of touch electrode rows.

The front multiplexer may change a first touch electrode row of the sensing active region in units of rows. The front multiplexer may include switch elements configured to connect one of K touch electrodes, which are connectable to each of the M sensor sensing units, to a corresponding sensor sensing unit.

K is a number of touch electrodes which are connectable to each of the M sensor sensing units at different points in time, and is N/M. The front multiplexer may turn on some of the switch elements on the basis of register values stored in a switch enable register.

The front multiplexer may change a location of a first touch electrode row of the sensing active region in units of rows in response to updating of the register values stored in the switch enable register. The sensing active region is changed in units of rows such that a touch occurrence location is included in the sensing active region.

In another aspect, a touch driving circuit comprises: a sensor sensing unit block configured to sense two or more touch electrodes from among N touch electrodes included in a touch panel; and a front multiplexer configured to select two or more touch electrodes from among the N touch electrodes, and to connect the two or more touch electrodes to the sensor sensing unit block.

The sensor sensing unit block may include M sensor sensing units.

M is greater than or equal to 2, and N is greater than M.

The front multiplexer is configured to select M touch electrodes, which are disposed in a sensing active region corresponding to a first sensing period, from among the N touch electrodes, and to match and connect the M touch electrodes to the M sensor sensing units.

The M sensor sensing units are configured to simultaneously sense the M touch electrodes disposed in the sensing active region during the first sensing period.

Each of the M sensor sensing units may include a differential amplifier having a sensing input end and a reference input end.

The front multiplexer is configured to: select the M touch electrodes disposed in the sensing active region from among the N touch electrodes, as M sensing electrodes; further select other M touch electrodes from among N-M touch electrodes remaining after excluding the M touch electrodes from the N touch electrodes, as M reference electrodes; connect each of the M sensing electrodes to a sensing input end of the differential amplifier of each of the M sensor sensing units; and connect each of the M reference electrodes to a reference input end of the differential amplifier of each of the M sensor sensing units.

The differential amplifier of each of the M sensor sensing units differentially amplifies a first input signal and a second input signal which are input from a corresponding sensing electrode and a corresponding reference electrode. The front multiplexer may include: a first-multiplexer configured to select the 2M touch electrodes from among the N touch electrodes, and to set a differential sensing region; M second-multiplexers corresponding to the M sensor sensing units, and configured to group the 2M touch electrodes into M touch electrode pairs; and M third-multiplexers corresponding to the M sensor sensing units, and configured to selectively connect two touch electrodes included in each of the M touch electrode pairs to a sensing input end and a reference input end of a differential amplifier included in each of the M sensor sensing units. The sensing active region may include H touch electrode rows from among a plurality of touch electrode rows included in the touch panel.

The front multiplexer may change a first touch electrode row of the sensing active region in units of rows. The front multiplexer changes a location of a first touch electrode row of the sensing active region in units of rows, using a switch enable register.

As described above, according to embodiments of the present disclosure, a multiplexer that enables effective touch driving, a touch display device including the multiplexer, and a touch driving circuit may be provided.

Also, according to embodiments of the present disclosure, a multiplexer that enables simultaneous sensing of touch electrodes disposed in a predetermined region during a predetermined sensing time, a touch display device including the multiplexer, and a touch driving circuit may be provided.

Also, according to embodiments of the present disclosure, a multiplexer that enables effective and various changes of a region that may be simultaneously sensed according to a sensing time, a touch display device including the multiplexer, and a touch driving circuit may be provided.

Also, according to embodiments of the present disclosure, a multiplexer suitable for a differential sensing scheme, a touch display device including the multiplexer, and a touch driving circuit are provided.

Also, according to embodiments of the present disclosure, a multiplexer suitable for a simultaneous driving scheme that simultaneously performs display driving and touch driving, a touch display device including the multiplexer, and a touch driving circuit may be provided.

Also, according to embodiments of the present disclosure, a multiplexer that is capable of changing a region that may be simultaneously sensed according to a sensing time, in units of lines, a touch display device, and a touch driving circuit may be provided.

It is to be understood that both the foregoing general description and the following detailed description are exemplary and explanatory and are intended to provide further explanation of the inventive concepts as claimed.

BRIEF DESCRIPTION OF THE DRAWINGS

It The above and other aspects, features and advantages of the present disclosure will be more apparent from the following detailed description taken in conjunction with the accompanying drawings, in which:

FIG. 13 is a diagram illustrating the operation of a second-multiplexer and a third-multiplexer corresponding to a single sensor sensing unit included in a front multiplexer according to embodiments of the present disclosure;

DETAILED DESCRIPTION

Figure 1:
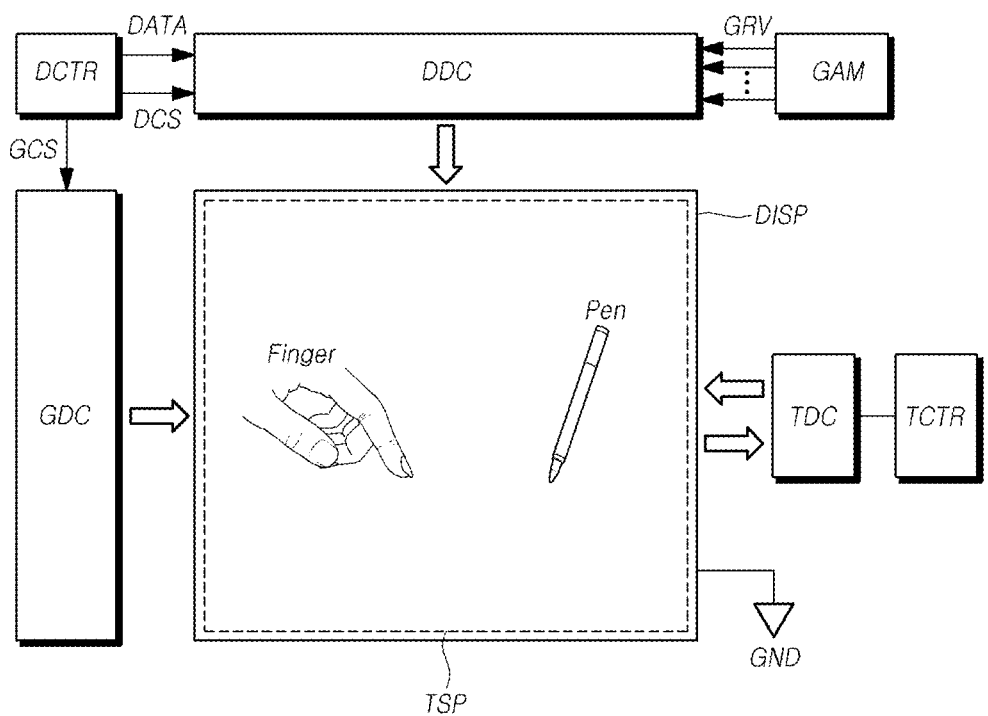
FIG. 1 is a system diagram illustrating a touch display device according to the embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", and "constituting" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
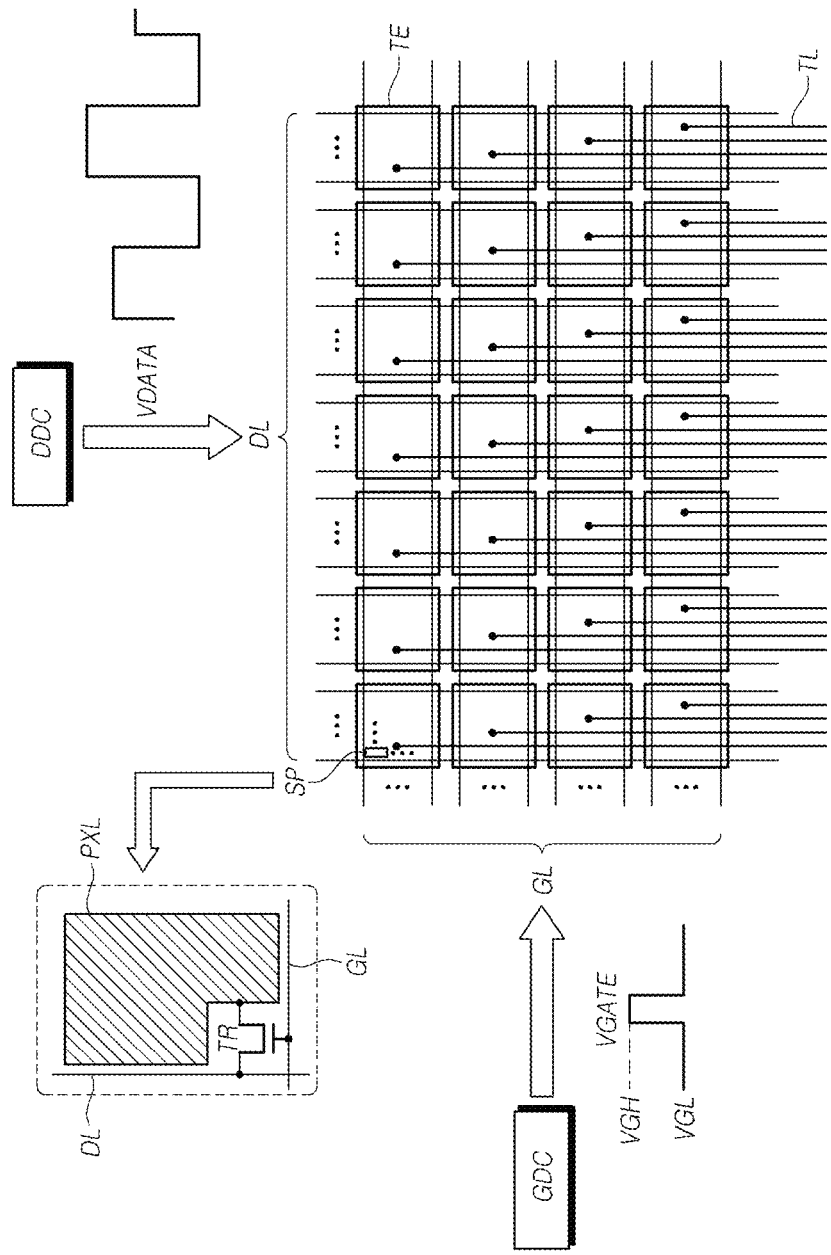
FIG. 2 illustrates a display part of a touch display device according to embodiments of the present disclosure.
Figure 3:
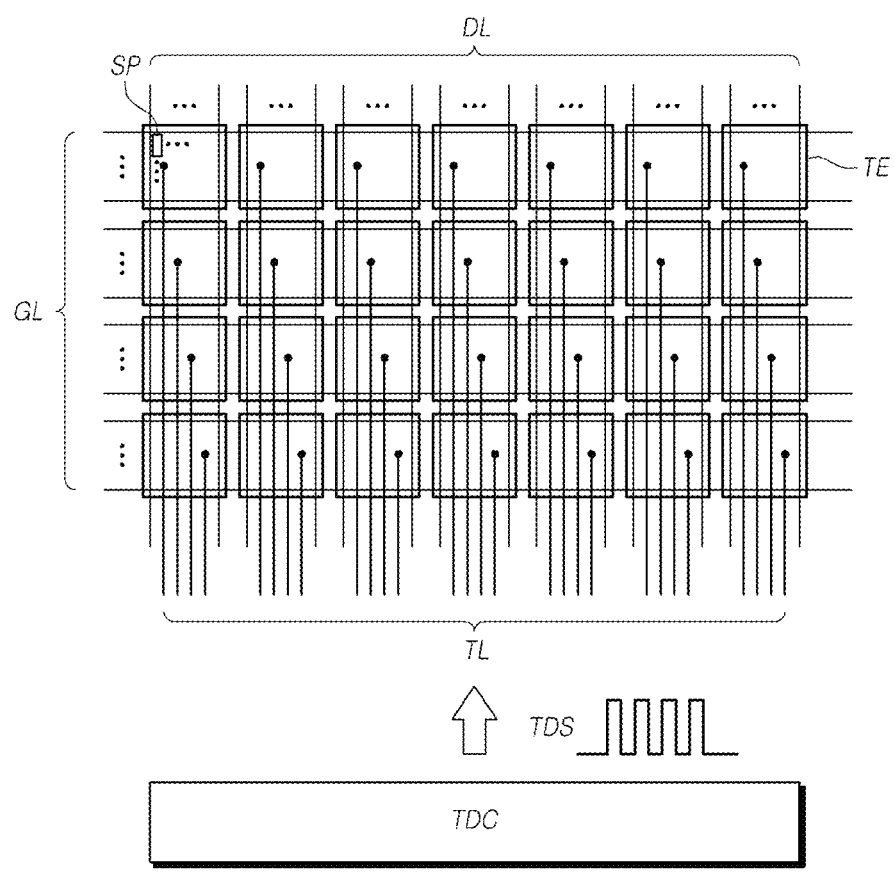
FIG. 3 is a diagram illustrating a touch sensing part of a touch display device according to embodiments of the present disclosure.

FIG. 1 is a system diagram illustrating a touch display device according to the embodiments of the present disclosure. FIG. 2 is a diagram illustrating a display part of a touch display device according to embodiments of the present disclosure. FIG. 3 is a diagram illustrating a touch sensing part of a touch display device according to embodiments of the present disclosure.

Referring to FIG. 1, a touch display device according to embodiments of the present disclosure may provide a display function for displaying an image. Also, the touch display device according to embodiments of the present disclosure may provide a touch sensing function that senses a user touch, and a touch input function that performs input processing associated with a user touch on the basis of the result of touch sensing.

Referring to FIGS. 1 and 2, in order to provide a display function, a plurality of data lines DL and a plurality of gate lines GL are disposed in the touch display device according to embodiments of the present disclosure. The touch display device may include: a display panel DISP in which a plurality of sub-pixels SP, defined by a plurality of data lines DL and a plurality of gate lines GL, are disposed; and display driving circuits for driving the display panel DISP.

Referring to FIGS. 1 and 2, display driving circuits may include a data driving circuit DDC for driving a plurality of data lines DL, a gate driving circuit GDC for driving a plurality of gate lines GL, a display controller DCTR for controlling a data driving circuit DDC and a gate driving circuit GDC, and the like.

Referring to FIG. 1 and FIG. 3, the touch display device according to embodiments of the present disclosure may include: a touch panel TSP in which a plurality of touch electrodes TE are disposed; a touch driving circuit TDC that drives the touch panel TSP and performs sensing; and a touch controller TCTR that detects whether a touch by a pointer of the user exists and/or detects touch coordinates using touch sensing data corresponding to the result of sensing by the touch driving circuit TDC, in order to provide the touch sensing function.

The pointer of the user may be a finger, pen, or the like.

The pen may be a passive pen that does not include a signal transmission/reception function, or may be an active pen that includes a signal transmission/reception function.

Referring to FIG. 2, a plurality of data lines DL disposed in the row direction (or column direction) and a plurality of gate lines GL disposed in the column direction (or row direction) may be disposed in the display panel DISP.

Also, referring to FIG. 3, a plurality of touch electrodes TE and a plurality of touch lines TL for electrically connecting the plurality of touch electrodes TE and the touch driving circuit TDC may be disposed in the touch panel TSP.

The touch driving circuit TDC may provide a touch driving signal TDS to some or all of the plurality of touch electrodes TE, and may sequentially sense some or all of the plurality of touch electrodes TE.

For example, the plurality of touch electrodes TE may be disposed in the form of a matrix.

The plurality of touch electrodes TE may be provided in various forms, respectively. For example, one touch electrode TE may be an electrode in the form of a plate without an opening part, may be an electrode of a mesh type including opening parts, or may be an electrode, many parts of which are bent.

When the touch electrode TE is an electrode in the form of a plate, the touch electrode TE may be a transparent electrode. When the touch electrode TE is an electrode of a mesh type or an electrode provided in a bent shape, the touch electrode TE may be an opaque electrode.

The touch panel TSP may exist outside the display panel DISP, or may be included in the display panel DISP. For ease of description, a description will be provided on the assumption that a touch panel TSP is included in a display panel DISP.

Each of the plurality of touch electrodes TE may overlap two or more sub pixels SP.

For example, the plurality of touch lines TL may be disposed in parallel with a plurality of data lines DL.

A touch driving circuit TDC for driving the plurality of touch electrodes TE may be further included.

The touch driving circuit TDC may supply a common voltage (VCOM) to the plurality of touch electrodes TE via the plurality of touch lines TL.

A display controller DCTR may supply various control signals (data control signal DCS and gate control signal GCS) to a data driving circuit DDC and a gate driving circuit GDC, and may control the data driving circuit DDC and the gate driving circuit GDC.

The display controller DCTR starts scanning according to a timing implemented in each frame, converts input image data received from the outside according to a data signal format used in the data driving circuit DDC, outputs the converted digital image data DATA, and controls data driving at a proper time based on the scanning.

The gate driving circuit GDC sequentially supplies a gate signal of an ON-voltage or an OFF-voltage to a plurality of gate lines GL under the control of the display controller DCTR.

When a predetermined gate line GL is opened by the gate driving circuit GDC, the data driving circuit DDC converts an image data signal received from the display controller DCTR into an image analog signal, and may supply a data signal VDATA corresponding to the image analog signal to a plurality of data lines DL.

The display controller DCTR may be a timing controller used in a general display technology, may be a control device that includes the timing controller and further performs another control function, or may be a control device different from the timing controller.

The display controller DCTR may be implemented a component separate from the data driving circuit DDC, or may be integrated with the data driving circuit DDC as an integrated circuit.

The data driving circuit DDC drives the plurality of data lines DL by supplying a data signal VDATA to the plurality of data lines DL. Here, the data driving circuit DDC is referred to as a "source driver".

The data driving circuit DDC may include at least one source driver integrated circuit (SDIC). Each source driver integrated circuit (SDIC) may include a shift register, a latch circuit, a digital to analog converter (DAC), an output buffer circuit, and the like. Each source driving integrated circuit (SDIC) may further include an analog to digital converter (ADC) according to circumstances.

Each SDIC may be connected to a bonding pad of the display panel DISP according to a tape automated bonding (TAB) scheme or a chip on glass (COG) scheme, or may be directly disposed on the display panel DISP. Depending on the case, the SDIC may be disposed by being integrated with the display panel DISP. Further, each source driver integrated circuit (SDIC) may be implemented according to a chip on film (COF) scheme in which the SDIC is mounted on a film connected to the display panel DISP.

The gate driving circuit GDC sequentially supplies a gate signal (VGATE, scan voltage, scan signal, or gate voltage) to the plurality of gate lines GL, and may sequentially drive the plurality of gate lines GL. Here, the gate driving circuit GDC is referred to as a "scan driver".

Here, the gate signal VGATE includes an OFF-level gate voltage that closes a corresponding gate line GL and an ON-level gate voltage that opens the corresponding gate line GL.

Particularly, the gate signal VGATE includes an OFF-level gate voltage that turns off a transistor connected to the corresponding gate line GL and an ON-level gate voltage that turns on the transistor connected to the corresponding gate line GL.

In the case of an N-type transistor, the OFF-level gate voltage is a low-level gate voltage VGL and the ON-level gate voltage is a high-level gate voltage VGH. In the case of a P-type transistor, the OFF-level gate voltage is a high-level gate voltage VGH and the ON-level gate voltage is a low-level gate voltage VGL. Hereinafter, for ease of description, it is assumed that the OFF-level gate voltage is a low-level gate voltage VGL and the ON-level gate voltage is a high-level gate voltage VGH.

The gate driving circuit GDC may include at least one gate driver integrated circuit (GDIC). Each gate driver integrated circuit (GDIC) may include a shift register, a level shifter, and the like.

Each gate driver integrated circuit (GDIC) may be connected to the bonding pad of the display panel DISP according to a tape automated bonding (TAB) scheme or a chip on glass (COG) scheme, or may be implemented in a gate in panel (GIP) type and may be directly disposed in the display panel DISP. Depending on the case, the driver integrated circuit (GDIC) may be disposed by being integrated with the display panel DISP. Further, each gate driver integrated circuit (GDIC) may be implemented according to a chip on film (COF) scheme in which the gate driver integrated circuit (GDIC) is mounted on a film connected to the display panel DISP.

The data driving circuit DDC may be located in only one portion (e.g., in the upper portion or in the lower portion) of the display panel DISP as illustrated in FIG. 1. Depending on the case, the data driving circuit DDC may be located in both portions (in the upper portion and the lower portion) of the display panel DISP according to a driving scheme, a panel design scheme, or the like.

The gate driving circuit GDC may be located in only one portion (e.g., in the left portion or in the right portion) of the display panel DISP as illustrated in FIG. 1. Depending on the case, the gate driving circuit GDC may be located in both portions (in the left portion and the right portion) of the display panel DISP according to a driving scheme, a panel design scheme, or the like.

The touch display device according to embodiments may be one of the various types of display devices, such as a liquid crystal display device, an organic light emitting display device, and the like. The display panel DISP according to embodiments may be one of the various types of display panels, such as a liquid crystal display panel, an organic light emitting display panel, and the like.

Each sub-pixel SP disposed in the display panel DISP may be configured to include one or more circuit elements (e.g., a transistor, capacitor, and the like).

For example, when the display panel DISP is a liquid crystal display panel, a pixel electrode PXL is disposed in each sub-pixel SP, and a transistor TR is electrically connected between the pixel electrode PXL and a data line DL. The transistor TR may be turned on by a gate signal VGATE supplied to a gate node via a gate line GL. When the transistor TR is turned on, the transistor TR outputs, to a drain node (or source node), a data signal VDATA supplied to a source node (or drain node) via a data line DL, so as to provide the data signal VDATA to a pixel electrode PXL electrically connected to the drain node (or source node). An electric field may be formed between the pixel electrode PXL to which the data signal VDATA is provided and a common electrode to which a common voltage VCOM is provided, and the capacitance may be formed between the pixel electrode PXL and the common electrode.

The structure of each sub-pixel SP may vary depending on a panel type, a function, and a design scheme, or the like.

The above-described plurality of touch electrodes TE may be touch sensors to which a touch driving signal (TDS) is provided during touch driving performed by the touch driving circuit TDC and may be sensed by the touch driving circuit TDC.

Also, the plurality of touch electrodes TE may be display driving electrodes to which a common voltage VCOM is provided, wherein the common voltage VCOM forms an electric field with a data signal VDATA during display driving.

Therefore, in the case of touch driving, a touch driving signal TDS is provided to a touch electrode TE. In the case of display driving, a common voltage VCOM is provided to a touch electrode TE.

When display driving and touch driving are performed at different timings, a touch electrode TE may function as a display driving electrode during display driving, and a touch electrode may function as a touch sensor during touch driving.

When display driving and touch driving are performed simultaneously, during a simultaneous driving period in which display driving and touch driving are performed at the same time, a touch electrode TE may function as a display driving electrode and a touch sensor, which will be described below.

Referring to FIGS. 2 and 3, in the case of a first touch electrode and a second touch electrode disposed in the same row among a plurality of touch electrodes, two or more data lines DL that overlap the first touch electrode may also overlap the second touch electrode. However, two or more gate lines GL that overlap the first touch electrode may not overlap the second touch electrode.

A plurality of touch lines TL may include a first touch line for electrically connecting the first touch electrode and a touch driving circuit TDC and a second touch line for electrically connecting the second touch electrode and the touch driving circuit TDC.

The first touch line and the second touch line may be insulated within a touch panel TSP. Depending on the case, the first touch line and the second touch line may be electrically connected within the touch driving circuit TDC.

The first touch line may overlap the second touch electrode, but may be insulated from the second touch electrode in the touch panel TSP.

The touch controller TCTR may be implemented as, for example, a micro control unit (MCU), a processor, or the like.

The display controller DCTR and a touch controller TCTR may be implemented separately or integratedly with each other.

The touch display device according to embodiments may sense a touch on the basis of a self-capacitance of a touch electrode TE, or may sense a touch on the basis of mutual-capacitance between common electrodes (CE).

When the touch display device according to embodiments of the present disclosure senses a touch on the basis of self-capacitance, the touch driving circuit TDC may provide a touch driving signal TDS, of which a voltage level varies, to one or more of a plurality of touch electrodes TE, may sense a touch sensing signal from a touch electrode TE to which the touch driving signal TDS is provided, and may output sensing data. The touch controller TCTR may determine whether a touch exists and/or calculate touch coordinates using the sensing data.

When the touch display device according to embodiments of the present disclosure senses a touch on the basis of mutual-capacitance, the touch driving circuit TDC may provide a touch driving signal TDS to a touch electrode that functions as a driving electrode from among a plurality of touch electrodes TE, may sense a touch sensing signal from another touch electrode TE that functions as a sensing electrode from among the plurality of touch electrodes TE, and may output sensing data. The touch controller TCTR may determine whether a touch exists and/or calculate touch coordinates using the sensing data.

Hereinafter, for ease of description, it is assumed that the touch display device according to embodiments of the present disclosure senses a touch on the basis of self-capacitance.

A touch driving signal TDS output from the touch driving circuit TDC may be a signal having a constant voltage level, or may be a signal of which the voltage level varies.

When a touch driving signal TDS is a signal of which the voltage level varies, the touch driving signal TDS may be provided in one of the various signal waveforms, for example, a sine waveform, triangular waveform, or a square waveform, and the like.

The data driving circuit DDC may convert a digital image data DATA received from the display controller DCTR into a data signal VDATA in the form of an analog voltage, using a digital-to-analog converter (DAC).

During the digital-to-analog conversion, the data driving circuit DDC may convert digital image data DATA into a data signal VDATA in the form of an analog voltage on the basis of a plurality of gamma reference voltages (GRV).

The plurality of gamma reference voltages GRV are supplied from a gamma circuit GAM. The gamma circuit GAM may exist inside or outside the data driving circuit DDC.

A ground voltage GND may be provided to the display panel DISP. The ground voltage GND may be a DC voltage, or may be an AC voltage of which the voltage level varies.

For ease of description, a description will be provided on the assumption that the touch panel TSP is included in the display panel DISP.

Figure 4:
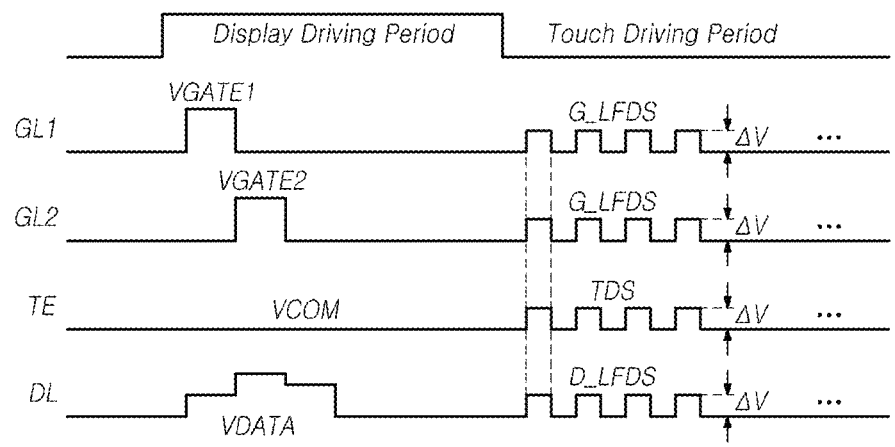
FIG. 4 is a time-division driving timing diagram related to display driving and touch driving of a touch display device according to embodiments of the present disclosure.

FIG. 4 is a time-division driving timing diagram related to display driving and touch driving of a touch display device according to embodiments of the present disclosure.

Referring to FIG. 4, the touch display device according to embodiments may proceed with display driving and touch driving separately in periods divided based on time. The above-described scheme is referred to as time-division driving.

During a display driving period, a common voltage VCOM in the form of a DC voltage is provided to the plurality of touch electrodes TE. A gate signal (VGATE1 and VGATE2) which has a turn-off level voltage VGL and changes to have a turn-on level voltage VGH at a scanning timing may be sequentially provided to a plurality of gate lines (GL1 and GL2). Corresponding data signals VDATA may be provided to a plurality of data lines DL.

During a touch driving period after the display driving period, a touch driving signal TDS of which the voltage level varies over time may be provided to some or all of the plurality of touch electrodes TE.

During the touch driving period, when the touch driving signal TDS is provided to a touch electrode TE which is a target of touch sensing, a signal which is the same as or corresponds to the touch driving signal TDS may be provided to a touch electrode TE which is disposed in the display panel DISP and is not a target of touch sensing, a data line DL, and a gate line GL. This is referred to as load free driving (LFD). The LFD prevents an unnecessary parasitic capacitance, and may prevent deterioration in touch sensitivity caused by the parasitic capacitance.

During the touch driving period, in order to prevent parasitic capacitance between a touch electrode TE, which is a target of sensing, and another touch electrode TE, an LFD signal which is the same as or corresponds to the touch driving signal TDS provided to the touch electrode TE which is the target of sensing may be provided to some or all of the plurality of touch electrodes TE disposed in the display panel DISP.

Also, during the touch driving period, in order to prevent parasitic capacitance between a touch electrode TE and a data line DL, an LFD signal D_LFDS which is the same as or corresponds to the touch driving signal TDS provided to the touch electrode TE which is the target of sensing may be provided to some or all of the plurality of data lines DL disposed in the display panel DISP.

Also, during the touch driving period, in order to prevent parasitic capacitance between a touch electrode TE and a gate line (GL1 and GL2), an LFD signal G_LFDS which is the same as or corresponds to the touch driving signal TDS provided to the touch electrode TE which is the target of sensing may be provided to some or all of the plurality of gate lines GL disposed in the display panel DISP.

During the touch driving period, the frequencies and phases of the LFD signals provided to a touch electrode TE which is disposed in the display panel DISP and is not the target of sensing, a data line DL and a gate line GL may correspond to the frequency and the phase of a touch driving signal TDS provided to the touch electrode TE which is the target of sensing.

During the touch driving period, the amplitudes of the LFD signals provided to a touch electrode TE which is disposed in the display panel DISP and is not a target of touch sensing, a data line DL, and a gate line GL may correspond to the amplitude ΔV of a touch driving signal TDS provided to a touch electrode TE which is the target of sensing.

Figure 5:
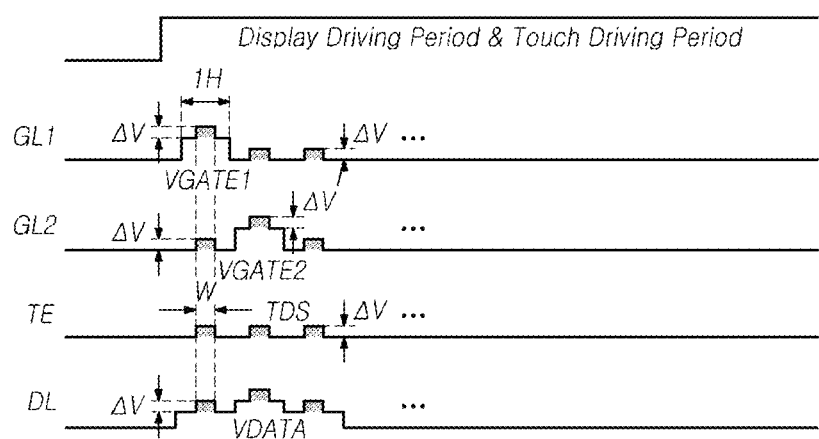
FIG. 5 is a simultaneous driving timing diagram related to display driving and touch driving of a touch display device according to embodiments of the present disclosure.
Figure 6:
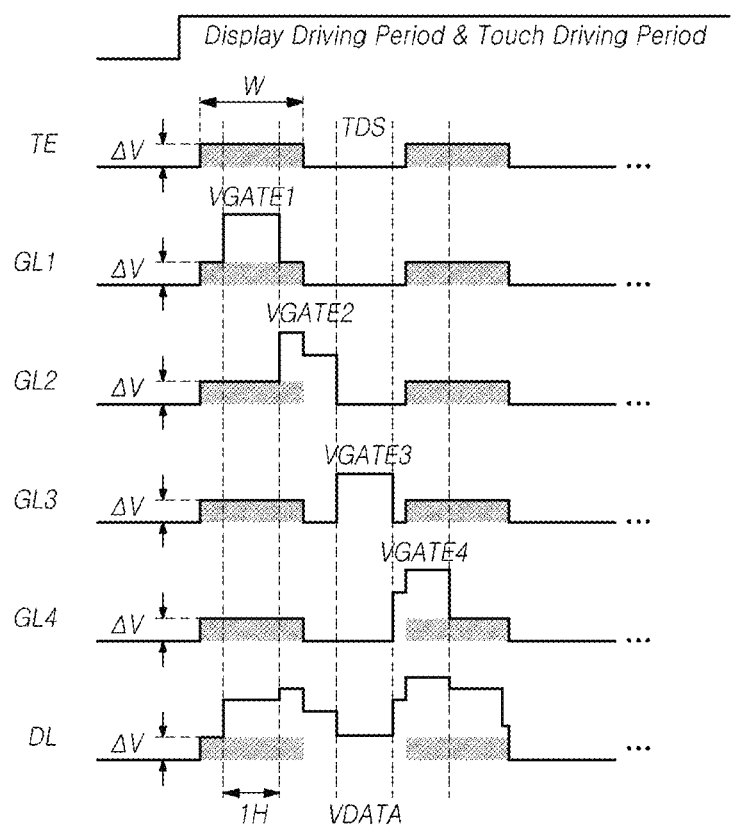
FIG. 6 is a simultaneous driving timing diagram related to display driving and touch driving of a touch display device according to embodiments of the present disclosure.

FIG. 5 is a simultaneous driving timing diagram related to display driving and touch driving of a touch display device according to embodiments of the present disclosure, and FIG. 6 is a simultaneous driving timing diagram related to display driving and touch driving of a touch display device according to embodiments of the present disclosure.

Referring to FIGS. 5 and 6, the touch display device according to embodiments of the present disclosure may simultaneously proceed with display driving and touch driving. The above-described scheme is referred to as simultaneous driving.

Referring to FIGS. 5 and 6, while a data signal VDATA for displaying an image is provided to a plurality of data lines DL and display driving is performed, a touch driving circuit TDC may supply a touch driving signal TDS that swings at a predetermined amplitude ΔV to a plurality of touch electrodes TE.

Here, the touch driving signal TDS may be a signal of which the voltage level swings (varies). The touch driving signal TDS may be referred to as a modulating signal, an AC signal, a pulse signal, or the like.

Referring to FIG. 5, the width W of the high level voltage period of the touch driving signal TDS may be shorter than one horizontal time 1H for display driving.

In this instance, during the high level voltage period of a data signal VDATA which is for displaying an image and is supplied to at least one of the plurality of data lines DL or during the high level voltage period of a gate signal (VGATE1 and VGATE2) supplied to at least one of the plurality of gate lines GL, the voltage level of the touch driving signal TDS may change at least one time.

Referring to FIG. 6, the width W of the high level voltage period of the touch driving signal TDS may be longer than one horizontal time 1H for display driving.

In this instance, during the high level voltage period of the touch driving signal TDS, the voltage level of a data signal VDATA for displaying an image supplied to at least one of the plurality of data lines DL may vary at least one time, or the voltage level of a gate signal VGATE supplied to at least one of the plurality of gate lines GL may vary at least one time.

Referring to FIGS. 5 and 6, in the case of simultaneous driving, a data signal VDATA supplied to a data line DL may be provided in the form including an original signal part for displaying an image and a touch driving signal TDS. Therefore, the data signal VDATA may include a voltage change point which is the same as that of the amplitude ΔV of the touch driving signal TDS.

Referring to FIGS. 5 and 6, in the case of simultaneous driving, a gate signal (VGATE1, VGATE2, VGATE3, and VGATE4) supplied to a gate line GL may be provided in the form including an original signal part for gate driving and a touch driving signal TDS. Therefore, the gate signal (VGATE1, VGATE2, VGATE3, and VGATE4) may include a voltage change point which is the same as that of the amplitude ΔV of the touch driving signal TDS.

As described above, the data signal VDATA has the same voltage change point as that of the amplitude ΔV of the touch driving signal TDS. Accordingly, if a part corresponding to the touch driving signal TDS is removed from the data signal VDATA, the data signal VDATA may be in the state same as a data signal VDATA of a display driving period in the case of time-division driving.

In the same manner, the gate signal (VGATE1, VGATE2, VGATE3, and VGATE4) has the same voltage change point as that of the amplitude ΔV of the touch driving signal TDS. Accordingly, if a part corresponding to the touch driving signal TDS is removed from the gate signal VGATE, the gate signal VGATE may be in the state same as a gate signal VGATE of a display driving period in the case of time-division driving.

The fact that the data signal VDATA has the same voltage change point as that of the amplitude ΔV of the touch driving signal TDS and the gate signal VGATE has the same voltage change point as that of the amplitude ΔV of the touch driving signal TDS may indicate that the data signal VDATA and the gate signal VGATE are modulated on the basis of the touch driving signal TDS.

As described above, by changing (modulating) signal waveforms of the data signal VDATA and the gate signal VGATE, display driving may not be affected by touch driving although display driving and touch driving are performed simultaneously in the case of simultaneous driving.

Also, the operation of changing signal waveforms of the data signal VDATA and the gate signal VGATE may correspond to a type of LFD driving which prevents unnecessary parasitic capacitance and improves touch sensitivity.

For example, simultaneous driving may be performed according to a gamma modulation scheme or a ground modulation scheme.

In the case of a gamma modulation scheme, a data driving circuit DDC may perform digital-to-analog conversion processing using a gamma reference voltage GRV of which the frequency, phase, and amplitude ΔV corresponds to those of the touch driving signal TDS during digital-to-analog conversion, so as to change a data signal VDATA.

Also, the data driving circuit DDC may change a turn-off level voltage VGL and a turn-on level voltage VGH required for generating a gate signal VGATE, to have to a frequency, phase, and amplitude ΔV corresponding to those of the touch driving signal TDS, and may generate the above-described gate signal VGATE.

In the case of a ground modulation scheme, a ground voltage GND provided to the display panel DISP is a signal of which the voltage level varies, and a frequency and phase is changed to correspond to those of the touch driving signal TDS. Accordingly, all types of signals provided to the display panel DISP may swing on the basis of the ground voltage GND.

The touch display device according to embodiments of the present disclosure may proceed with simultaneous driving, and may proceed with time-division driving at a predetermined timing.

Figure 7:
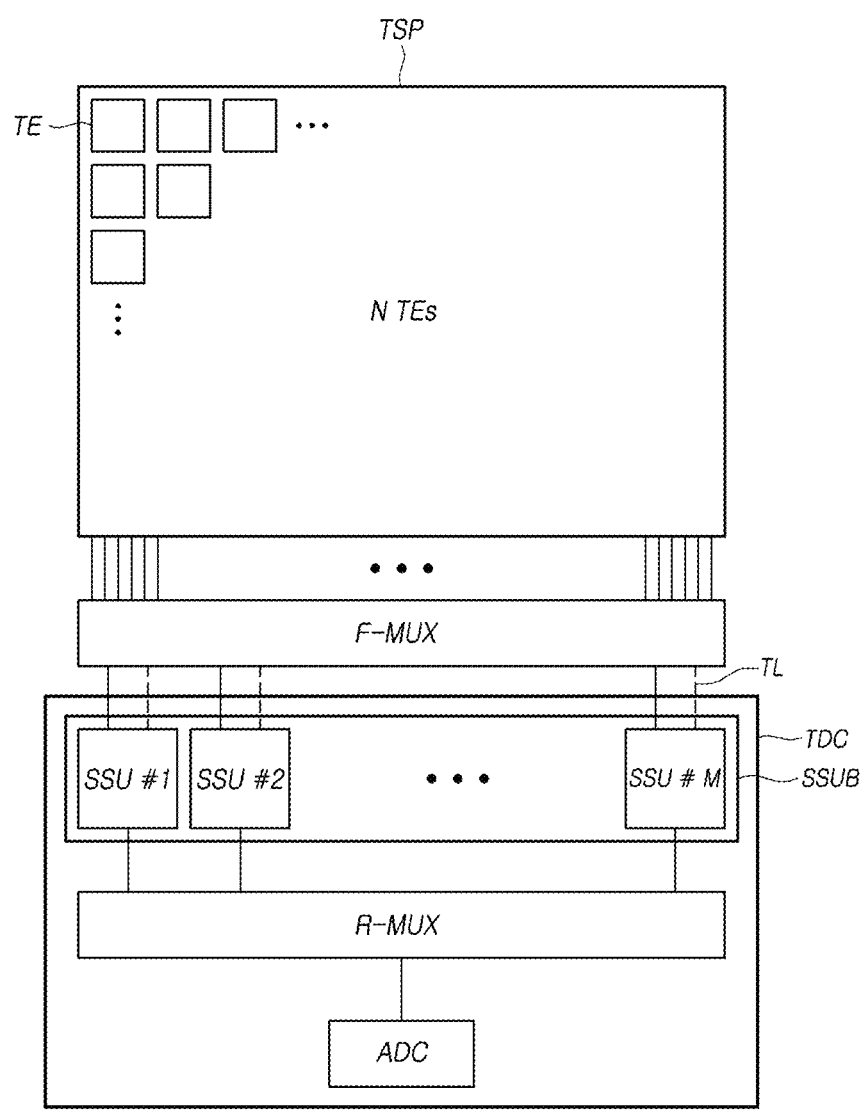
FIG. 7 is a diagram illustrating a touch system of a touch display device according to embodiments of the present disclosure.

FIG. 7 is a diagram illustrating a touch system of a touch display device according to embodiments of the present disclosure.

Referring to FIG. 7, the touch system of the touch display device according to embodiments of the present disclosure may include a touch panel TSP, a front multiplexer F-MUX, a sensor sensing unit block SSUB, a rear multiplexer R-MUX, an analog-to-digital converter ADC, and the like.

N touch electrodes TE and N touch lines TL are disposed in the touch panel TSP.

The front multiplexer F-MUX may select M touch electrodes TE or 2M touch electrodes TE from among the N touch electrodes disposed in the touch panel TSP, and may match and connect the selected touch electrodes TE to M sensor sensing units (SSU #1 to SSU #M[YMH1]) included in the sensor sensing block SSUB. Here, M is greater than or equal to 2, and N is greater than 2M.

That is, via multiplexing by the front multiplexer F-MUX, each of the M sensor sensing units (SSU #1 to SSU #M) may be connected to two touch electrodes TE or may be connected to one touch electrode TE.

The M sensor sensing units (SSU #1 to SSU #M) may simultaneously perform differential sensing of the 2M touch electrodes TE, or may simultaneously perform single sensing of the M touch electrode TE.

That is, each of the M sensor sensing units (SSU #1 to SSU #M) simultaneously perform sensing, and each of the M sensor sensing units (SSU #1 to SSU #M) may simultaneously perform differential sensing of two touch electrodes TE, or may perform single sensing of one touch electrode TE.

The rear multiplexer R-MUX, may select some of the M sensor sensing units (SSU #1 to SSU #M), and may connect the selected sensor sensing units to the analog-to-digital converter ADC.

The analog-to-digital converter ADC may convert a sensing result signal received from a sensor sensing unit SSU connected by the rear multiplexer R-MUX, into a sensing value corresponding to a digital value, and may output sensing data including the converted sensing value.

A touch controller TCTR may determine whether a touch exists and/or may calculate touch coordinates on the basis of the sensing data.

Figure 8:
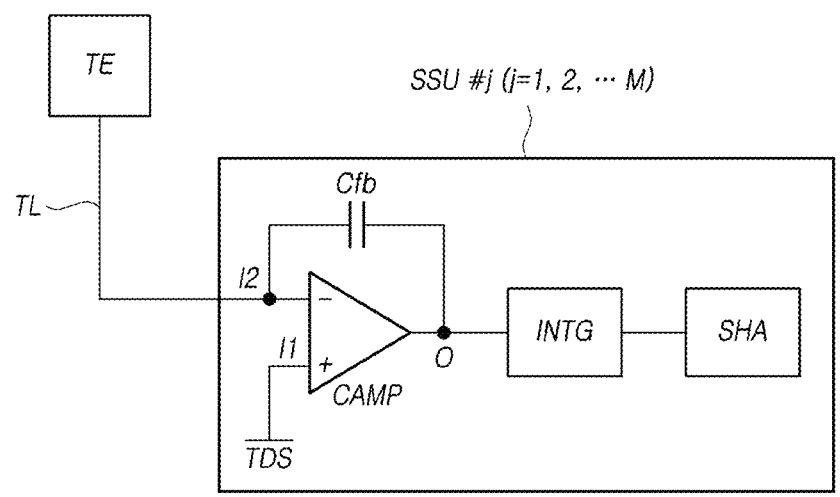
FIG. 8 is a diagram illustrating a sensor sensing unit for single sensing in a touch system of a touch display device according to embodiments of the present disclosure.

FIG. 8 is a diagram illustrating a $j^{th}$ sensor sensing unit (SSU #j, j=1, 2, . . . , M) for single sensing in a touch system of a touch display device according to embodiments of the present disclosure.

Referring to FIG. 8, a $j^{th}$ sensor sensing unit (SSU #j, j=1, 2, . . . , M) among the M sensor sensing units (SSU #1 to SSU #M) may sense one touch electrode TE. This is referred to as a single sensing scheme.

In the case of the single sensing scheme, the $j^{th}$ sensor sensing unit SSU #j may include a charge amplifier CAMP, an integrator INTG, a sample and hold circuit SHA, and the like.

The charge amplifier CAMP may include an operation amplifier and a feedback capacitor Cfb.

The charge amplifier CAMP may output a touch driving signal TDS input into a non-inverting input end I1 to a corresponding touch electrode TE via a corresponding touch line TL, via an inverting input end I2.

Subsequently, the charge amplifier CAMP may receive a touch sensing signal from the corresponding touch electrode TE via the inverting input end I2.

That is, electric charge generated from the touch electrode TE to which the touch driving signal TDS is provided may be input into the inverting input end I2 of the charge amplifier CAMP. Accordingly, electric charge is stored in the feedback capacitor Cfb. As the feedback capacitor Cfb is charged, a signal is output to an output end[YMH2] of the charge amplifier CAMP.

The integrator (INTG) may integrate the output signal of the charge amplifier CAMP, and may output an integrated value.

The sample and hold circuit SHA may store a signal corresponding to the integrated value, and may output the same to the analog-to-digital converter ADC via the rear multiplexer R-MUX.

Figure 9:
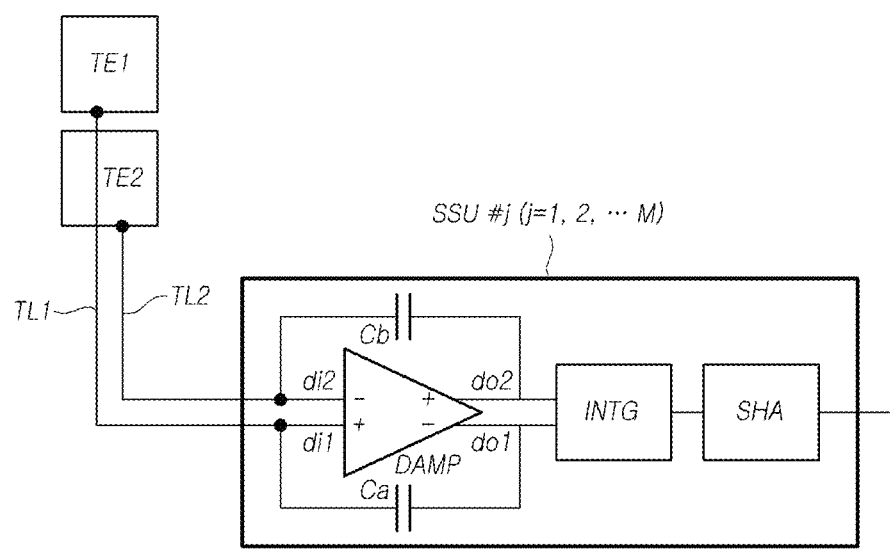
FIG. 9 is a diagram illustrating a sensor sensing unit for differential sensing in a touch system of a touch display device according to embodiments of the present disclosure.

FIG. 9 is a diagram illustrating a $j^{th}$ sensor sensing unit (SSU #j, j=1, 2, . . . , M) for differential sensing in a touch system of a touch display device according to embodiments of the present disclosure.

Referring to FIG. 9, a $j^{th}$ sensor sensing unit (SSU #j, j=1, 2, . . . , M) among the M sensor sensing units (SSU #1 to SSU #M) may perform differential sensing of two touch electrodes (TE1 and TE2). This is referred to as a differential sensing scheme.

In the case of the differential sensing scheme, the $j^{th}$ sensor sensing unit (SSU #j, j=1, 2, . . . , M) may include a differential amplifier DAMP, an integrator INTG, a sample and hold circuit SHA, and the like.

The differential amplifier DAMP may differentially amplify a first input signal and a second input signal received respectively from a first touch electrode TE1 and a second touch electrode TE2 via a first input end di1 and a second input end di2, and may output a differential sensing signal. The differential amplifier DAMP may include one output end.

Depending on the case, the differential amplifier DAMP may include two output ends (do1 and do2). In this instance, the differential amplifier DAMP may be a fully differential amplifier.

In this instance, the differential sensing signal of the differential amplifier DAMP may include a first output signal and a second output signal.

The difference between the first output signal and the second output signal may be proportional to the difference between the first input signal and the second input signal.

In the differential amplifier DAMP, a first capacitor Ca may be connected between the first input end di1 and the first output end do1, and a second capacitor Cb may be connected between the second input end di2 and the second output end do2.

One of the first touch electrode TE1 and the second touch electrode TE2 may be a sensing electrode, and the other is a reference electrode.

Therefore, one of the first input end di1 and the second input end di2 may be a sensing input end connected to a sensing electrode, and the other is a reference input end connected to a reference electrode.

For example, when the second touch electrode TE2 is designated as a sensing electrode and the first touch electrode TE1 is designated as a reference electrode, the result obtained by performing differential sensing once using the differential amplifier DAMP may be the result of sensing the second touch electrode TE2 which is the sensing electrode.

Subsequently, when the result of sensing the first touch electrode TE1 is required, differential sensing needs to be performed again by designating the first touch electrode TE1 as a sensing electrode and designating the second touch electrode TE2 as a reference electrode. In the case of the differential sensing scheme, while simultaneous driving is performed, when a data signal VDATA and a gate signal VGATE are modulated on the basis of a touch driving signal TDS which also functions as a common voltage VCOM for display driving, as illustrated in FIGS. 5 and 6, the effect of parasitic capacitance may be offset by a data line DL and a gate line GL. Accordingly, a touch may be easily determined.

Hereinafter, components (touch system) for sensing a touch in the above-described touch display device will be described in detail.

Figure 10:
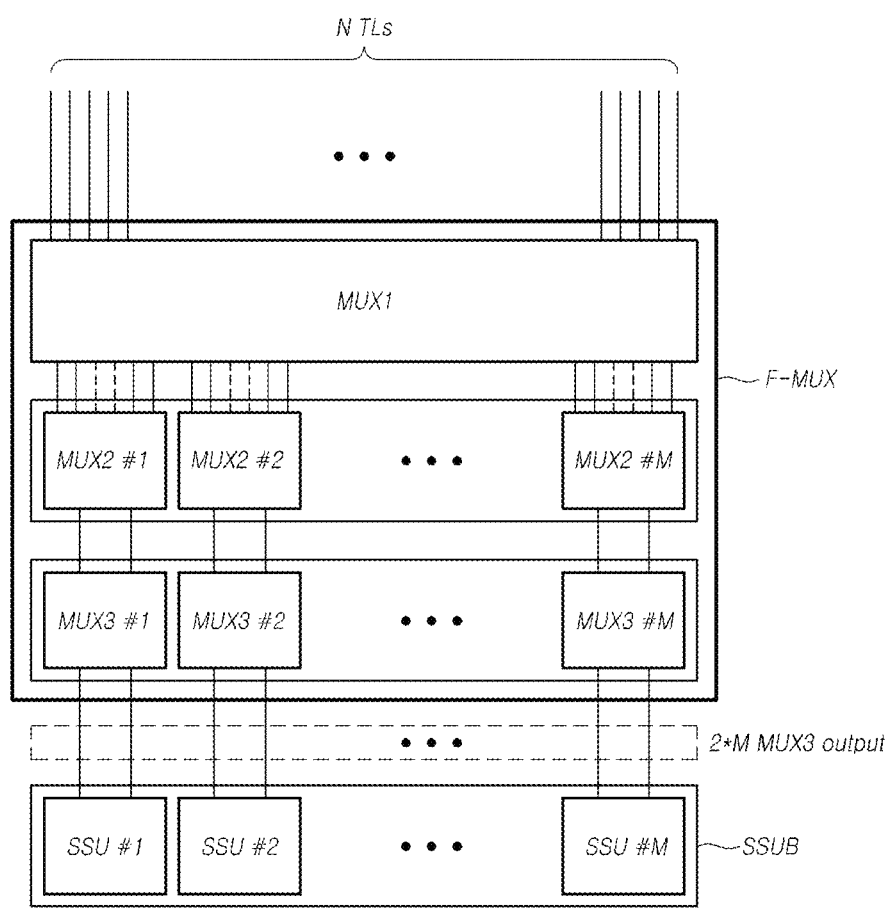
FIG. 10 is a diagram illustrating a front multiplexer in a touch system of a touch display device according to embodiments of the present disclosure.

FIG. 10 is a diagram illustrating a front multiplexer F-MUX in a touch system of a touch display device according to embodiments of the present disclosure.

Referring to FIG. 10, a touch system of a touch display device according to embodiments of the present disclosure may include: a touch panel TSP including N touch electrodes (TE 1 to TE N); a sensor sensing unit block SSUB for sensing two or more touch electrodes from among the N touch electrodes (TE 1 to TE N); and a front multiplexer F-MUX that selects two or more touch electrodes from among the N touch electrodes (TE1 to TE N), and connects the selected touch electrodes to the sensor sensing unit block SSUB.

The sensor sensing unit block SSUB may include M sensor sensing units (SSU #1 to SSU #M).

Here, M is the number of touch electrodes which are simultaneously sensed, and may be greater than or equal to 2. In the case of differential sensing, M is the number of touch electrodes which are designated as sensing electrodes among sensing electrodes and reference electrodes designated when differential sensing is performed. N is the total number of touch electrodes, and is greater than M.

The front multiplexer F-MUX may select M touch electrodes located in a sensing active region corresponding to a first sensing period from among the N touch electrodes (TE 1 to TE N), and may connect the M touch electrodes and M sensor sensing units (SSU #1 to SSU #M).

The M sensor sensing units (SSU #1 to SSU #M) may simultaneously sense the M touch electrodes located in the sensing active region.

Each of the M touch electrodes located in the sensing active region may be spaced apart from each other. That is, each of the M touch electrodes which are simultaneously sensed may be spaced apart from each other (➔ Case 1).

Unlike the above, the M touch electrodes disposed within the sensing active region may be disposed to be adjacent to each other. That is, the M touch electrodes which are simultaneously sensed may be disposed to be close to each other (➔ Case 2).

Each of the M sensor sensing units (SSU #1 to SSU #M) may include a differential amplifier DAMP having a sensing input end IN_SEN and a reference input end IN_REF in order to perform differential sensing.

The front multiplexer F-MUX may select M touch electrodes disposed in a sensing active region from among N touch electrodes (TE 1 to TE N) as M sensing electrodes, and may further select M other touch electrodes from among N-M touch electrodes remaining after excluding the M touch electrodes from the N touch electrodes (TE 1 to TE N) as M reference electrodes.

The front multiplexer F-MUX may connect each of the M sensing electrodes to a sensing input end IN_SEN of the differential amplifier DAMP of each of the M sensor sensing units (SSU #1 to SSU #M), and may connect each of the M reference electrodes to a reference input end IN_REF of the differential amplifier DAMP of each of the M sensor sensing units (SSU #1~SSU #M).

The differential amplifier DAMP of each of the M sensor sensing units (SSU #1 to SSU #M) may differentially amplify a first input signal and a second input signal which are input from a corresponding sensing electrode and a corresponding reference electrode, respectively.

The front multiplexer F-MUX may include a first-multiplexer MUX1, M second-multiplexers (MUX2 #1 to MUX2 #M), and M third-multiplexers (MUX3 #1 to MUX3 #M).

The M second-multiplexers (MUX2 #1 to MUX2 #M) may correspond to M sensor sensing units (SSU #1 to SSU #M).

The M third-multiplexers (MUX3 #1 to MUX3 #M) may correspond to M sensor sensing units (SSU #1 to SSU #M).

The first-multiplexer MUX1 may select 2M touch electrodes from among the N touch electrodes (TE1 to TE N), so as to set a differential sensing region.

Here, the differential sensing region may include a sensing active region. That is, the differential sensing region may include a sensing active region where sensing electrodes are disposed, and regions where reference electrodes are disposed.

The M second-multiplexers (MUX2 #1 to MUX2 #M) may group the 2M touch electrodes into M touch electrode pairs.

The M third-multiplexers (MUX3 #1 to MUX3 #M) may selectively connect two touch electrodes included in each of the M touch electrode pairs to a sensing input end IN_SEN and a reference input end IN_REF of a differential amplifier DAMP included in each of the M sensor sensing units (SSU #1 to SSU #M).

Figure 11:
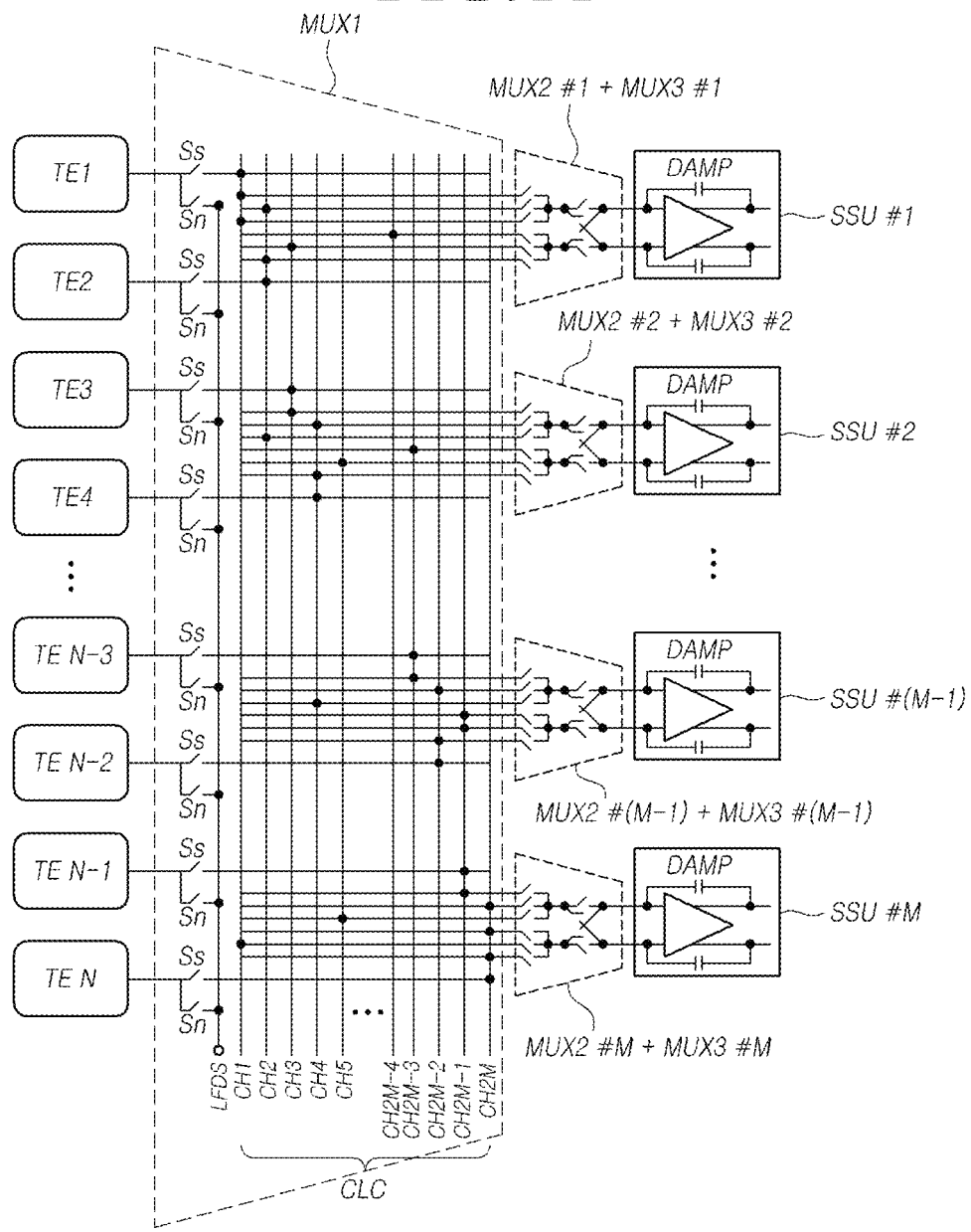
FIG. 11 is a diagram illustrating a front multiplexer in detail according to embodiments of the present disclosure.
Figure 12:
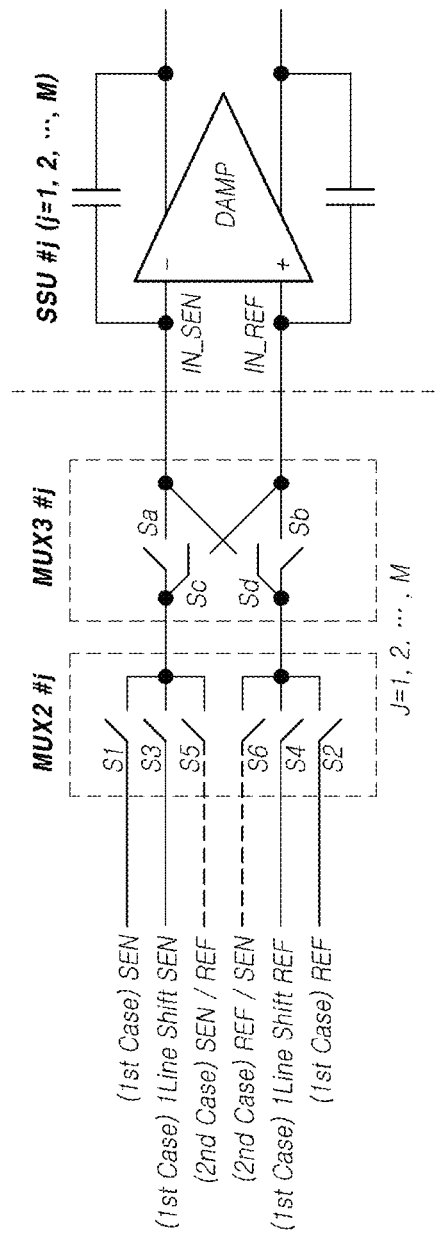
FIG. 12 is a diagram illustrating a second-multiplexer and a third-multiplexer corresponding to a single sensor sensing unit included in a front multiplexer according to embodiments of the present disclosure.

FIG. 11 is a diagram illustrating a front multiplexer F-MUX in detail according to embodiments of the present disclosure. FIG. 12 is a diagram illustrating a second-multiplexer and a third-multiplexer corresponding to a single sensor sensing unit included in a front multiplexer F-MUX according to embodiments of the present disclosure. FIG. 13 is a diagram illustrating a second-multiplexer and a third-multiplexer corresponding to a single sensor sensing unit included in a front multiplexer F-MUX according to embodiments.

Referring to FIG. 11, a first-multiplexer MUX1 may select 2M touch electrodes from among N touch electrodes (TE 1 to TE N), so as to set a differential sensing region.

Here, the differential sensing region may include a sensing active region. That is, the differential sensing region may include a sensing active region where sensing electrodes are disposed, and regions where reference electrodes are disposed.

The M second-multiplexers (MUX2 #1 to MUX2 #M) may group the 2M touch electrodes into M touch electrode pairs.

The M third-multiplexers (MUX3 #1 to MUX3 #M) may selectively connect two touch electrodes included in each of the M touch electrode pairs to a sensing input end IN_SEN and a reference input end IN_REF of a differential amplifier DAMP included in each of the M sensor sensing units (SSU #1 to SSU #M).

The first-multiplexer MUX1 may include a selection switch Ss and an auxiliary switch Sn connected to each of the N touch electrodes (TE 1 to TE N).

The first-multiplexer MUX1 may include a connection line circuit CLC where connection wires are disposed, the connection wires connecting an output end of a selection switch Ss connected to each of the N touch electrodes (TE 1 to TE N) and input ends of six switches (S1 to S6) of each of the M second-multiplexers (MUX2 #1 to MUX2 #M).

The connection line circuit CLC may include a plurality of first connection wires disposed in a first direction, and a plurality of second connection wires disposed in a second direction which is different from the first direction. The N touch electrodes (TE 1 to TE N) and the M second-multiplexers (MUX2 #1 to MUX2 #M) are connected to both ends of the plurality of first connection wires disposed in the first direction. The plurality of second connection wires disposed in the second direction may correspond to 2M channels (CH1 to CH 2M), respectively, and may function of connecting a distant touch electrode to a first connection wires connected to another touch electrode. The plurality of first connection wires and the second connection wires may intersect each other. Among intersect points between the plurality of first and second connection wires, points that require connection of the N touch electrodes (TE 1 to TE N) and the M second-multiplexers (MUX2 #1 to MUX2 #M) are in contact.

The first-multiplexer MUX1 may turn on a selection switch Ss connected to each of 2M touch electrodes among the N touch electrodes (TE 1 to TE N), and may select the 2M touch electrodes among the N touch electrodes (TE 1 to TE N).

The first-multiplexer MUX1 may turn on an auxiliary switch Sn connected to each of the touch electrodes remaining after excluding the 2M touch electrodes from the N touch electrodes (TE 1 to TE N), and provide a load free driving signal LFDS to the touch electrodes remaining after excluding the 2M touch electrodes from the N touch electrodes (TE 1 to TE N).

When grouping the 2M touch electrodes into M touch electrode pairs, the M second-multiplexers (MUX2 #1 to MUX2 #M) may group two touch electrodes disposed adjacent to each other into a single touch electrode pair (➔ Case 1).

When grouping the 2M touch electrodes into M touch electrode pairs, the M second-multiplexers (MUX2 #1 to MUX2 #M) may group two touch electrodes disposed to be one or more other touch electrodes spaced apart from each other, into a single touch electrode pair (➔ Case 2).

Each of the M second-multiplexers (MUX2 #1 to MUX2 #M) may include first and second switches (S1 and S2) that group a first touch electrode and a second touch electrode adjacent to the first touch electrode at a first sensing timing, and may include third and fourth switches (S3 and S4) that group the second touch electrode and a third touch electrode adjacent to the second touch electrode at a second sensing timing.

Each of the M second-multiplexers (MUX2 #1 to MUX2 #M) may include fifth and sixth switches (S5 and S6) which group a first touch electrode and a second touch electrode which is one or more touch electrodes spaced apart from the first touch electrode.

Each of the M third-multiplexers (MUX3 #1 to MUX3 #M) may include four polarity assignment switches (Sa, Sb, Sc, and Sd) which selectively connect two touch electrodes included in each of the M touch electrode pairs to a sensing input end IN_SEN and a reference input end IN_REF of a differential amplifier DAMP of a corresponding sensor sensing unit.

The differential sensing scheme may include a first case (Case 1) and a second case (Case 2).

The first case (Case 1) is the case of performing differential sensing of two adjacent touch electrodes.

The second case (Case 2) is the case of performing differential sensing of two touch electrodes distant from each other.

Referring to FIG. 12, among six switches (S1 to S6) included in the M second-multiplexers (MUX2 #1 to MUX2 #M), first to fourth switches (S1, S2, S3, and S4) are only used for the first case, and fifth and sixth switches (S5 and S6) are used only for the second case. Therefore, the M second-multiplexers (MUX2 #1 to MUX2 #M) may set a differential sensing type (Case 1 and Case 2).

Referring to FIG. 12, in the first case, among four polarity assignment switches (Sa, Sb, Sc, and Sd) included in the M third-multiplexers (MUX3 #1 to MUX3 #M), two polarity assignment switches (Sa and Sb) located in parallel are always in the turned on state, and two polarity assignment switches (Sc and Sd) intersecting each other are always in the turned off state.

In the second case, among four polarity assignment switches (Sa, Sb, Sc, and Sd) included in the M third-multiplexers (MUX3 #1 to MUX3 #M), two polarity assignment switches (Sa and Sb) located in parallel and two polarity assignment switches (Sc and Sd) intersecting each other are turned on and off, alternately.

Referring to FIG. 13, in the first case (Case 1), among first to fourth switches (S1, S2, S3, and S4) included in the M second-multiplexers (MUX2 #1 to MUX2 #M), first and second switches (S1 and S2) are turned on (ON) and third and fourth switches (S3 and S4) are turned off (OFF) at a first sensing time. In this instance, two polarity assignment switches (Sa and Sb) which are included in the M third-multiplexers (MUX3 #1 to MUX3 #M) and are disposed in parallel are in the turned on state.

At a second sensing time after the first sensing time, among first to fourth switches (S1, S2, S3, and S4) included in the M second-multiplexers (MUX2 #1 to MUX2 #M), third and fourth switches (S3 and S4) are turned on and first and second switches (S1 and S2) are turned off. In this instance, two polarity assignment switches (Sa and Sb) which are included in the M third-multiplexers (MUX3 #1 to MUX3 #M) and are disposed in parallel are in the turned on state.

Referring to FIG. 13, in the second case (Case 2), fifth and sixth switches (S5 and S6) included in the M second-multiplexers (MUX2 #1 to MUX2 #M) are in the turned on state, and two polarity assignment switches (Sa and Sb) which are included in the M third-multiplexers (MUX3 #1 to MUX3 #M) and are disposed in parallel are turned on at a first sensing time.

At a second sensing time after the first sensing time, fifth and sixth switches (S5 and S6) included in the M second-multiplexers (MUX2 #1 to MUX2 #M) are in the turned on state, and two polarity assignment switches (Sc and Sd) which are included in the M third-multiplexers (MUX3 #1 to MUX3 #M) and intersect each other are turned on.

Figure 14:
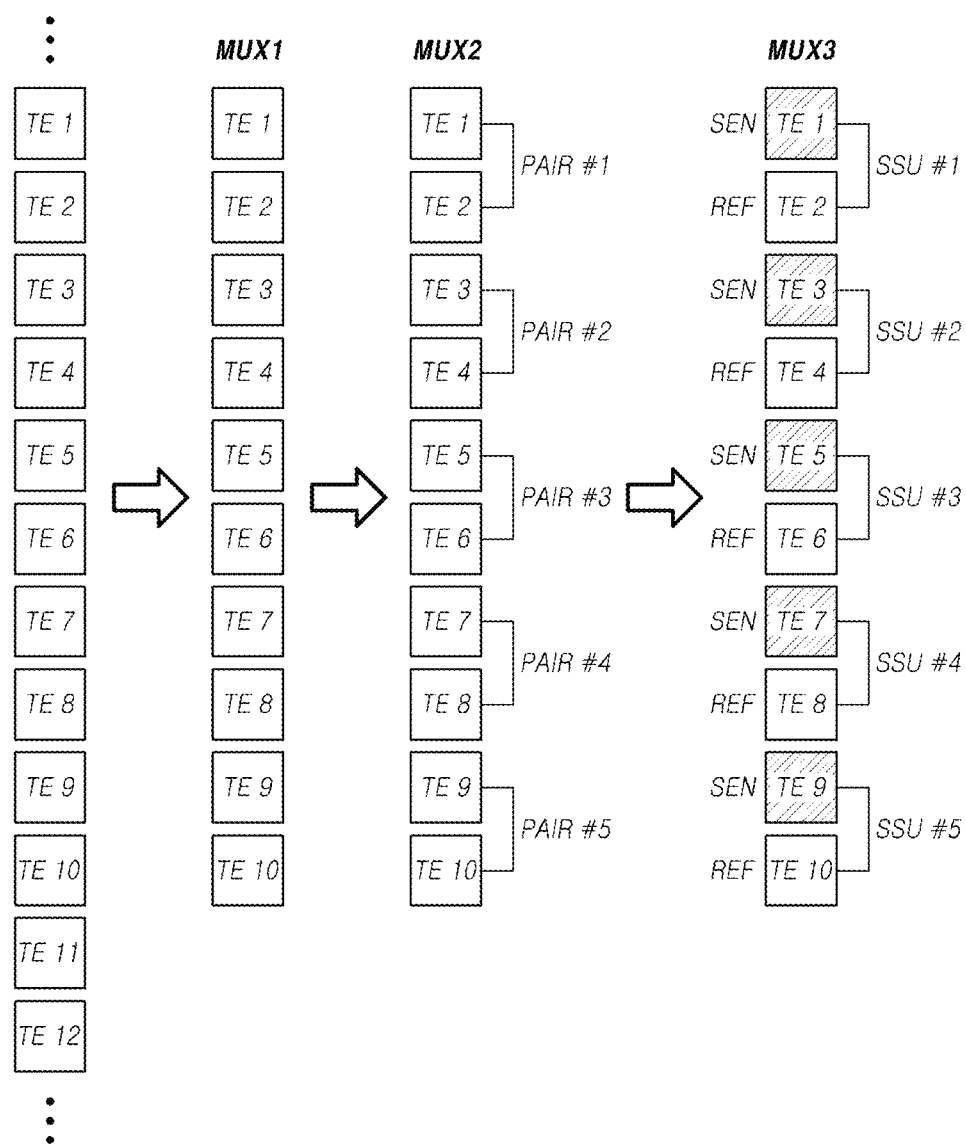
FIG. 14 is a diagram illustrating a first case of differential sensing according to embodiments of the present disclosure.
Figure 15:
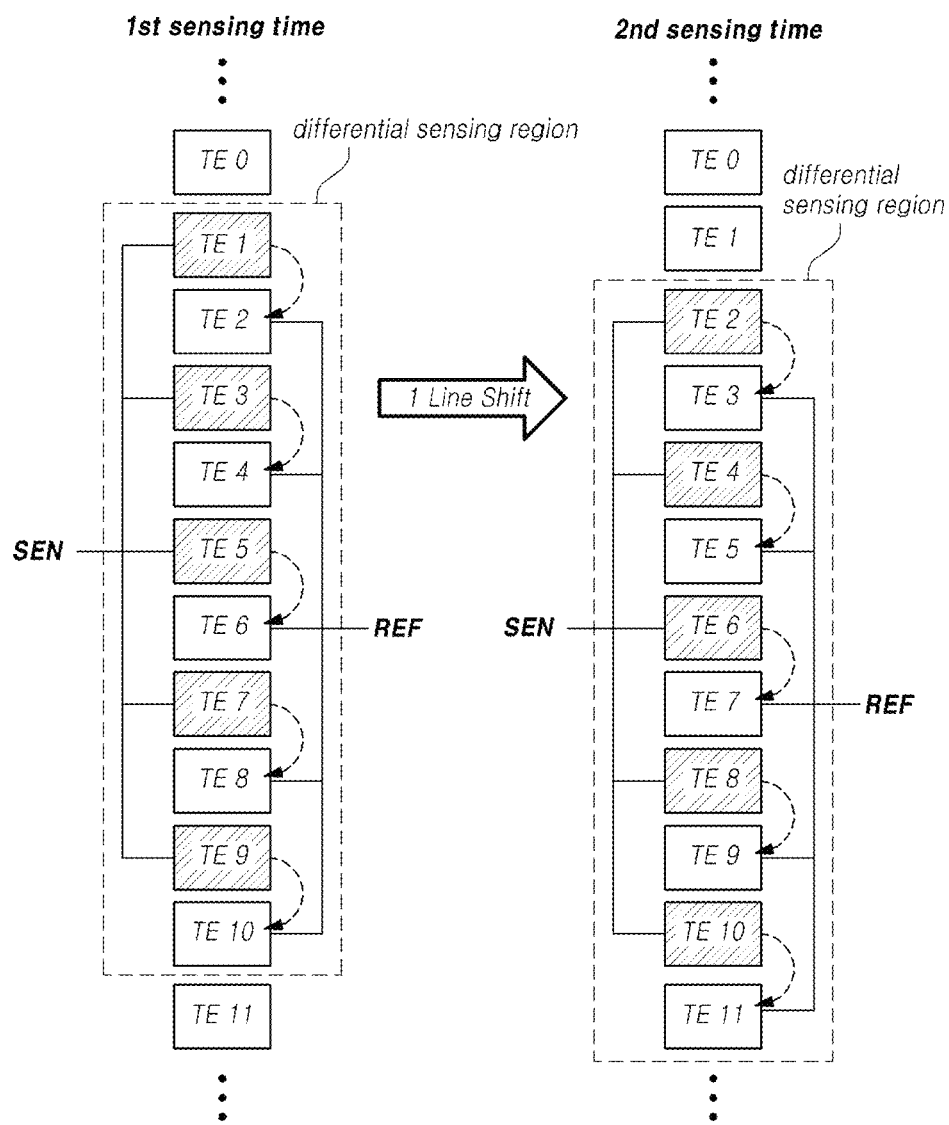
FIG. 15 is a diagram illustrating differential sensing during a first sensing time and a second sensing time, in the first case of differential sensing according to embodiments of the present disclosure.

FIG. 14 is a diagram illustrating the first case of differential sensing according to embodiments of the present disclosure. It is assumed that M=5. FIG. 15 is a diagram illustrating differential sensing during a first sensing time and a second sensing time, in the first case of differential sensing according to embodiments of the present disclosure.

Figure 16:
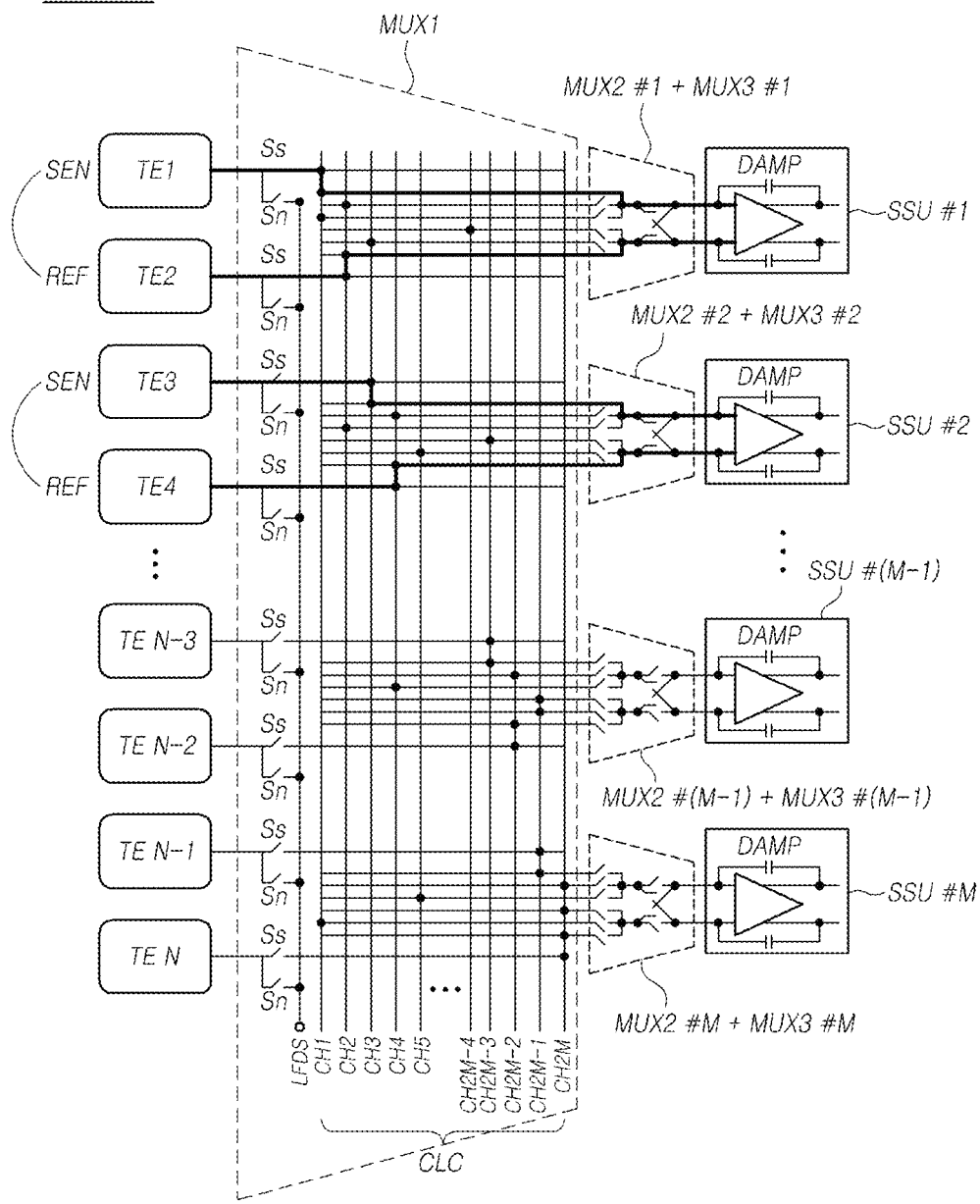
FIG. 16 is a diagram illustrating the operation of a front multiplexer during a first sensing time in the first case of differential sensing according to embodiments of the present disclosure.
Figure 17:
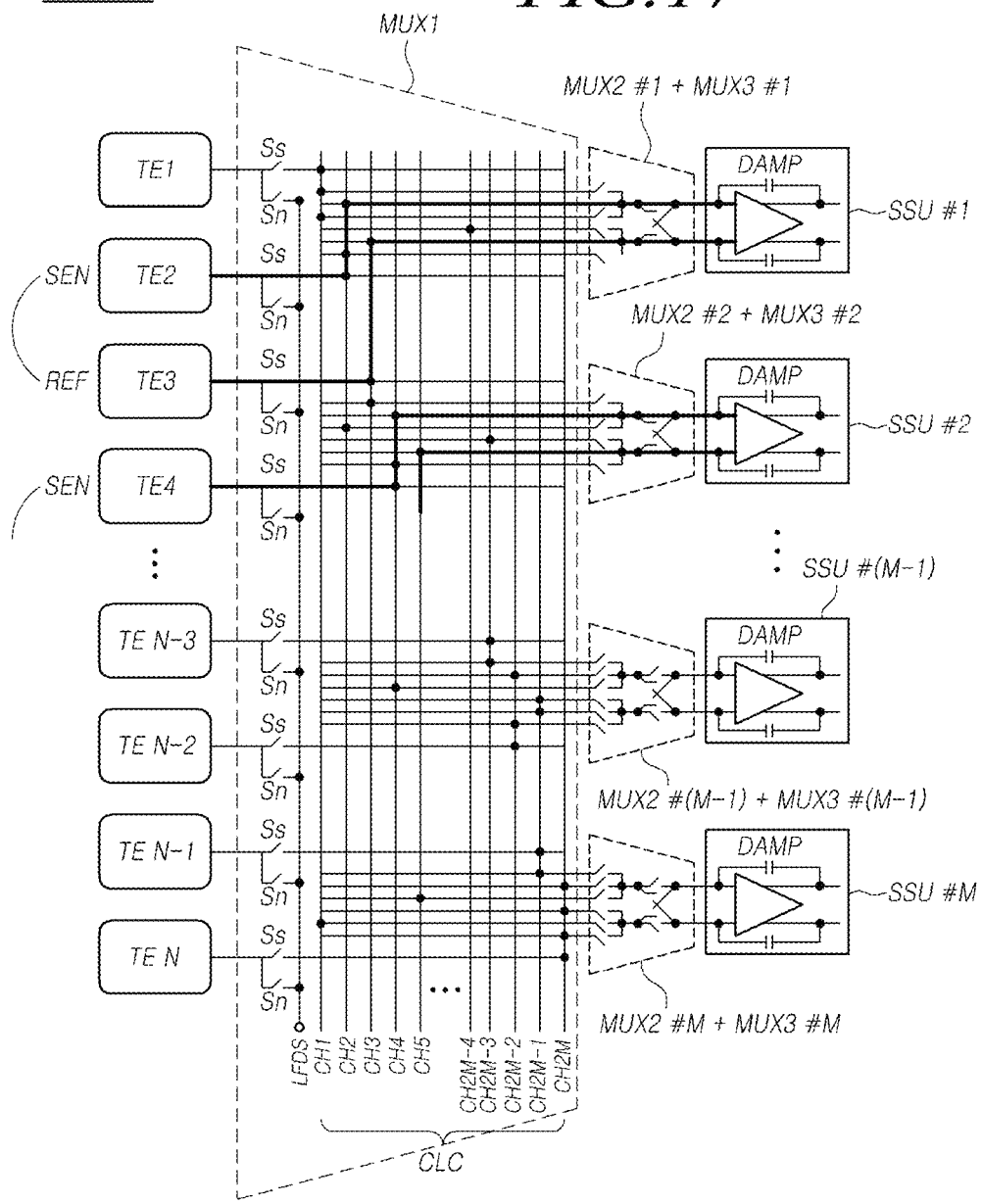
FIG. 17 is a diagram illustrating the operation of a front multiplexer during a second sensing time in the first case of differential sensing according to embodiments of the present disclosure.

FIG. 16 is a diagram illustrating the operation of a front multiplexer F-MUX during a first sensing time in the first case of differential sensing according to embodiments, and FIG. 17 is a diagram illustrating the operation of a front multiplexer F-MUX during a second sensing time in the first case of differential sensing according to embodiments.

Referring to FIG. 14, a first-multiplexer MUX1 may select 10(2M=2*5) touch electrodes (TE 1 to TE 10) from among N touch electrodes (TE 1, TE 2, . . . , TE 10, TE 11, TE 12, . . . , and TE N), and may set a differential sensing region.

Here, the differential sensing region may include a sensing active region. That is, the differential sensing region may include a sensing active region where sensing electrodes (SEN; TE 1, TE 3, TE 5, TE 7, and TE 9) are disposed, and regions where reference electrodes (REF; TE 2, TE 4, TE 6, TE 8, and TE 10) are disposed.

Five (M=5) second-multiplexers (MUX2 #1 to MUX2 #5) may group 10(2M) touch electrodes into five (M=5) touch electrode pairs (PAIR #1 to PAIR #5).

In the first case (case 1), when grouping 10(2M) touch electrodes into five touch electrode pairs (PAIR #1 to PAIR #5), the five second-multiplexers (MUX2 #1 to MUX2 #5) may group two touch electrodes disposed adjacent to each other into a single touch electrode pair.

For example, a first touch electrode TE 1 and a second touch electrode TE 2 which are adjacent to each other are grouped into a first touch electrode pair PAIR #1. A third touch electrode TE 3 and a fourth touch electrode TE 4 which are adjacent to each other are grouped into a second touch electrode pair PAIR #2. A fifth touch electrode TE 5 and a sixth touch electrode TE 6 which are adjacent to each other are grouped into a third touch electrode pair PAIR #3. A seventh touch electrode TE 7 and an eighth touch electrode TE 8 which are adjacent to each other are grouped into a fourth touch electrode pair PAIR #4. A ninth touch electrode TE 9 and a tenth touch electrode TE 10 which are adjacent to each other are grouped into a fifth touch electrode pair PAIR #5.

The M (M=5) third-multiplexers (MUX3 #1 to MUX3 #5) may selectively connect two touch electrodes included in each of the 5 touch electrode pairs (PAIR #1 to PAIR #5) to a sensing input end IN_SEN and a reference input end IN_REF of a differential amplifier DAMP included in each of the M (M=5) sensor sensing units (SSU #1 to SSU #5).

For example, the first touch electrode TE 1 and the second touch electrode TE 2 included in the first touch electrode pair PAIR #1 are connected to a first sensor sensing unit SSU #1. The third touch electrode TE 3 and the fourth touch electrode TE 4 included in the second touch electrode pair PAIR #2 are connected to a second sensor sensing unit SSU #2. The fifth touch electrode TE 5 and the sixth touch electrode TE 6 included in the third touch electrode pair PAIR #3 are connected to a third sensor sensing unit SSU #3. The seventh touch electrode TE 7 and the eighth touch electrode TE 8 included in the fourth touch electrode pair PAIR #4 are connected to a fourth sensor sensing unit SSU #4. The ninth touch electrode TE 9 and the tenth touch electrode TE 10 included in the fifth touch electrode pair PAIR #5 are connected to a fifth sensor sensing unit SSU #5.

Referring to FIG. 15, in the first case of differential sensing according to embodiments of the present disclosure, a region where the first to tenth touch electrodes (TE 1 to TE 10) are disposed is set to a differential sensing region during a first sensing time, as described with reference to FIG. 14.

During the first sensing time, the first sensor sensing unit SSU #1 may differentially sense (differentially amplify) the first touch electrode TE 1 which corresponds to a sensing electrode SEN, and the second touch electrode TE 2 which corresponds to a reference electrode REF. The second sensor sensing unit SSU #2 may differentially sense (differentially amplify) the third touch electrode TE 3 which corresponds to a sensing electrode SEN, and the fourth touch electrode TE 4 which corresponds to a reference electrode REF. The third sensor sensing unit SSU #3 may differentially sense (differentially amplify) a fifth touch electrode TE 5 which corresponds to a sensing electrode SEN, and a sixth touch electrode TE 6 which corresponds to a reference electrode REF. The fourth sensor sensing unit SSU #4 may differentially sense (differentially amplify) the seventh touch electrode TE 7 which corresponds to a sensing electrode SEN, and the eighth touch electrode TE 8 which corresponds to a reference electrode REF. The fifth sensor sensing unit SSU #5 may differentially sense (differentially amplify) the ninth touch electrode TE 9 which corresponds to a sensing electrode SEN, and the tenth touch electrode TE 10 which corresponds to a reference electrode REF.

During the first sensing time, a touch driving circuit TDC may obtain sensing values associated with the first, third, fifth, seventh, and ninth touch electrodes (TE1, TE3, TE5, TE7, and TE9) corresponding to sensing electrodes SEN, via differential sensing.

During the second sensing time after the first sensing time, according to first case, a differential sensing region may be set by shifting the differential sensing region of the first sensing time by one line (i.e., one touch electrode row). That is, the differential sensing region, obtained by shifting the existing differential sensing region by one line, is a region where the second to eleventh touch electrodes (TE 2 to TE 11) are disposed.

During the second sensing time, the first sensor sensing unit SSU #1 may differentially sense (differentially amplify) the second touch electrode TE 2 which corresponds to a sensing electrode SEN, and the third touch electrode TE 3 which corresponds to a reference electrode REF. The second sensor sensing unit SSU #2 may differentially sense (differentially amplify) the fourth touch electrode TE 4 which corresponds to a sensing electrode SEN, and the fifth touch electrode TE 5 which corresponds to a reference electrode REF. The third sensor sensing unit SSU #3 may differentially sense (differentially amplify) the sixth touch electrode TE 6 which corresponds to a sensing electrode SEN, and the seventh touch electrode TE 7 which corresponds to a reference electrode REF. The fourth sensor sensing unit SSU #4 may differentially sense (differentially amplify) the eighth touch electrode TE 8 which corresponds to a sensing electrode SEN, and the ninth touch electrode TE 9 which corresponds to a reference electrode REF. The fifth sensor sensing unit SSU #5 may differentially sense (differentially amplify) the tenth touch electrode TE 10 which corresponds to a sensing electrode SEN, and the eleventh touch electrode TE 11 which corresponds to a reference electrode REF.

During the second sensing time, the touch driving circuit TDC may obtain sensing values associated with the second, fourth, sixth, eighth, and tenth touch electrodes (TE 2, TE 4, TE 6, TE 8, and TE 10) corresponding to sensing electrodes SEN, via differential sensing.

Referring to FIG. 16, to briefly describe the multiplexing operation of the front multiplexer F-MUX during the first sensing time in the first case, the first sensor sensing unit SSU #1 may differentially sense (differentially amplify) the first touch electrode TE 1 which corresponds to a sensing electrode SEN, and the second touch electrode TE 2 which corresponds to a reference electrode REF.

During the first sensing time, the first-multiplexer MUX1 of the front multiplexer F-MUX may turn on selection switches Ss connected to first to tenth touch electrodes (TE 1 to TE 10) included in a differential sensing region.

A first second-multiplexer MUX2 #1 corresponding to the first sensor sensing unit SSU #1 may turn on first and second switches (S1 and S2) among six switches (S1 to S6).

Also, a first third-multiplexer MUX3 #1 corresponding to the first sensor sensing unit SSU #1 may turn on two switches (Sa and Sb) disposed in parallel among four polarity assignment switches (Sa, Sb, Sc, and Sd).

Accordingly, the first sensor sensing unit SSU #1 may be connected to the first touch electrode TE 1 corresponding to a sensing electrode SEN and the second touch electrode TE 2 corresponding to a reference electrode REF.

Therefore, the differential amplifier DAMP of the first sensor sensing unit SSU #1 may differentially amplify the first touch electrode TE 1 which corresponds to a sensing electrode SEN, and the second touch electrode TE 2 which corresponds to a reference electrode REF.

In the same manner as the above-described multiplexing operation, other touch electrodes (TE 2, TE3, . . . , and the like) included in the differential sensing region during the first sensing time may be electrically connected to a corresponding sensor sensing unit.

Referring to FIG. 17, to briefly describe the multiplexing operation of the front multiplexer F-MUX during the second sensing time after the first sensing time in the first case, the first sensor sensing unit SSU #1 may differentially sense (differentially amplify) the second touch electrode TE 2 which corresponds to a sensing electrode SEN, and the third touch electrode TE 3 which corresponds to a reference electrode REF.

Here, during the second sensing time, the second touch electrode TE 2 is a sensing electrode (1 line shift SEN) which is one line shifted when compared to the touch electrode of the first sensing time. The third touch electrode TE 3 is a reference electrode (1 line shift REF) which is one line shifted when compared to the touch electrode at the first sensing time.

During the second sensing time, the first-multiplexer MUX1 of the front multiplexer F-MUX may turn on selection switches Ss connected to the second to eleventh touch electrodes (TE 2 to TE 11) included in a differential sensing region.

A first second-multiplexer MUX2 #1 corresponding to the first sensor sensing unit SSU #1 may turn on third and fourth switches (S3 and S4) connected to a sensing electrode (1 line shift SEN) and a reference electrode (1 line shift REF) which are shifted by one line, among six switches (S1 to S6).

Also, a first third-multiplexer MUX3 #1 corresponding to the first sensor sensing unit SSU #1 may turn on two switches (Sa and Sb) disposed in parallel among four polarity assignment switches (Sa, Sb, Sc, and Sd).

Accordingly, the first sensor sensing unit SSU #1 may be connected to the second touch electrode TE 2 corresponding to a sensing electrode SEN and the third touch electrode TE 3 corresponding to a reference electrode REF.

Therefore, the differential amplifier DAMP of the first sensor sensing unit SSU #1 may differentially amplify the second touch electrode TE 2 which corresponds to a sensing electrode SEN, and the third touch electrode TE 3 which corresponds to a reference electrode REF.

In the same manner as the above-described multiplexing operation, other touch electrodes (TE 3, TE 4, . . . , and the like) included in the differential sensing region during the second sensing time may be electrically connected to a corresponding sensor sensing unit.

Figure 18:
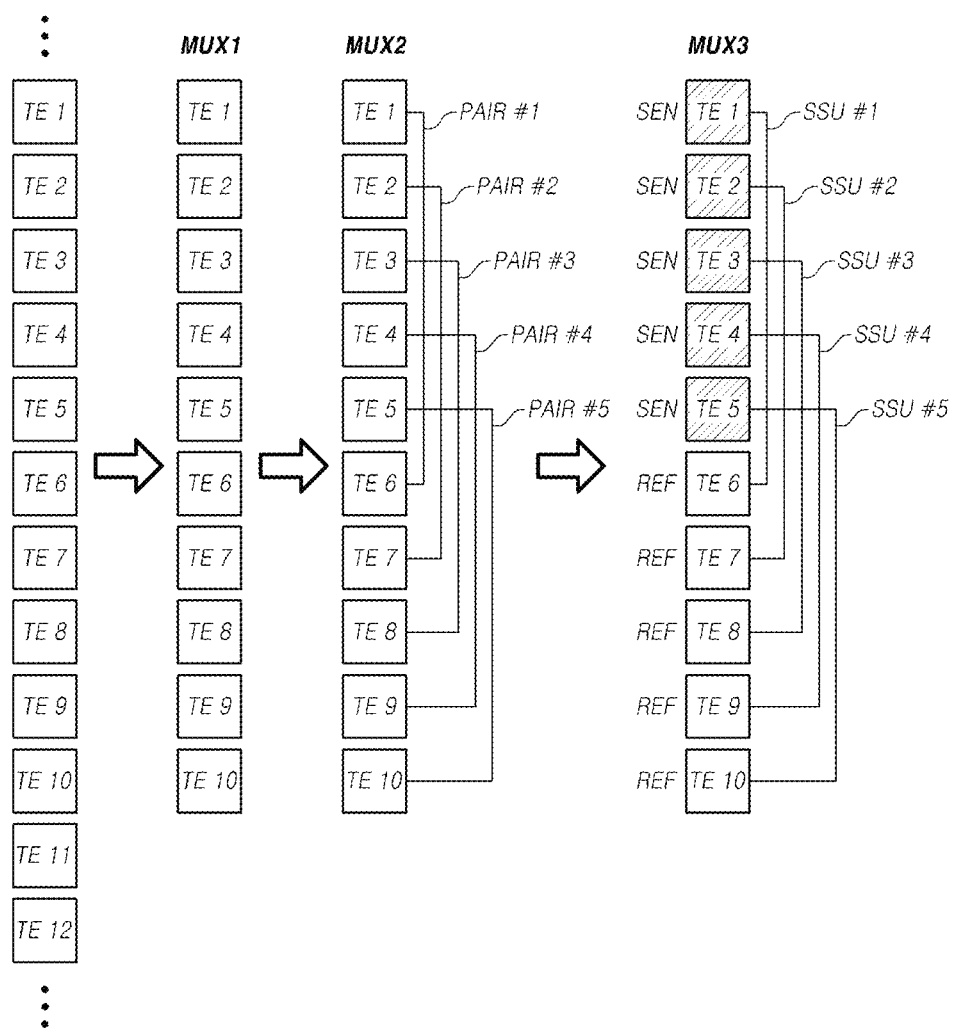
FIG. 18 is a diagram illustrating a second case of differential sensing according to embodiments of the present disclosure.
Figure 19:
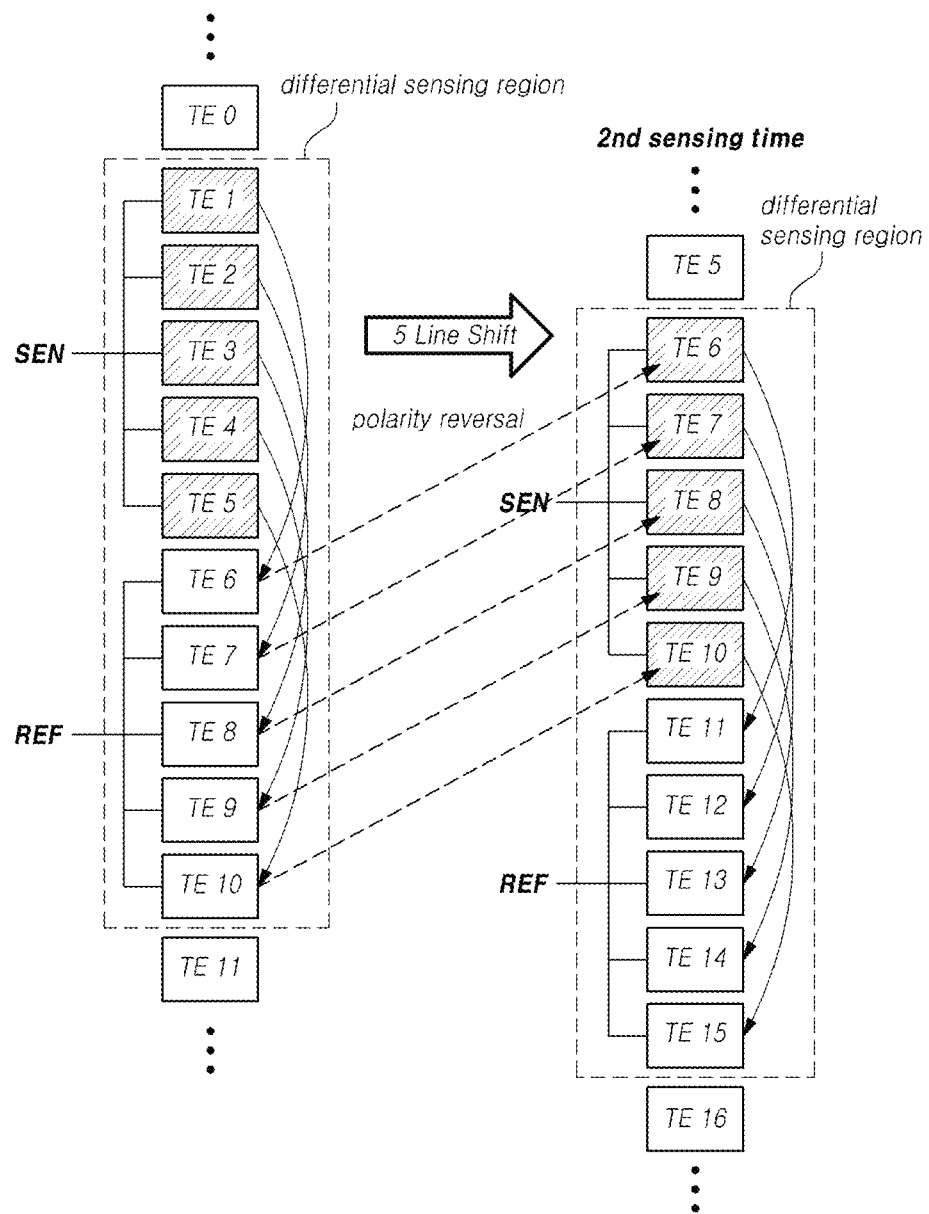
FIG. 19 is a diagram illustrating the second case of differential sensing according to embodiments of the present disclosure.
Figure 20:
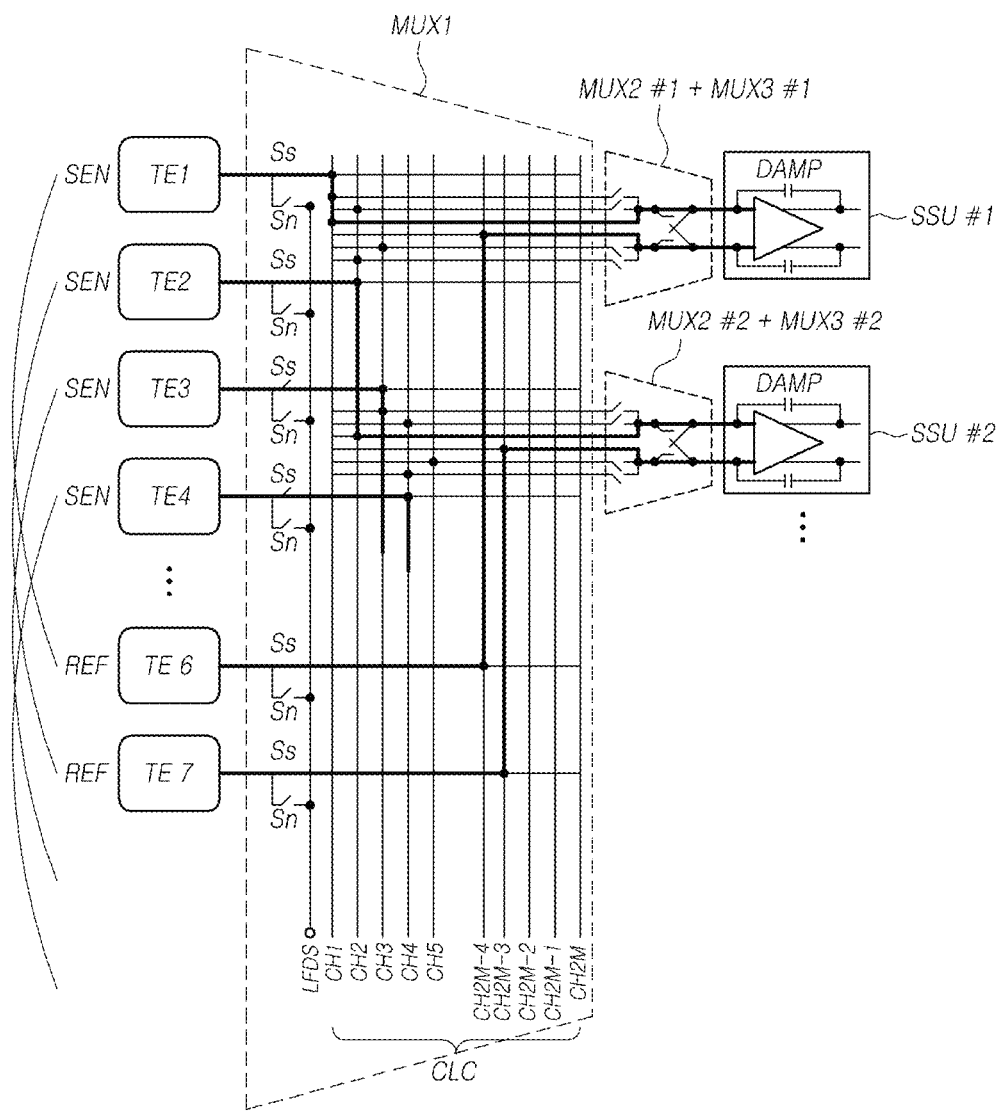
FIG. 20 is a diagram illustrating the second case of differential sensing according to embodiments of the present disclosure.
Figure 21:
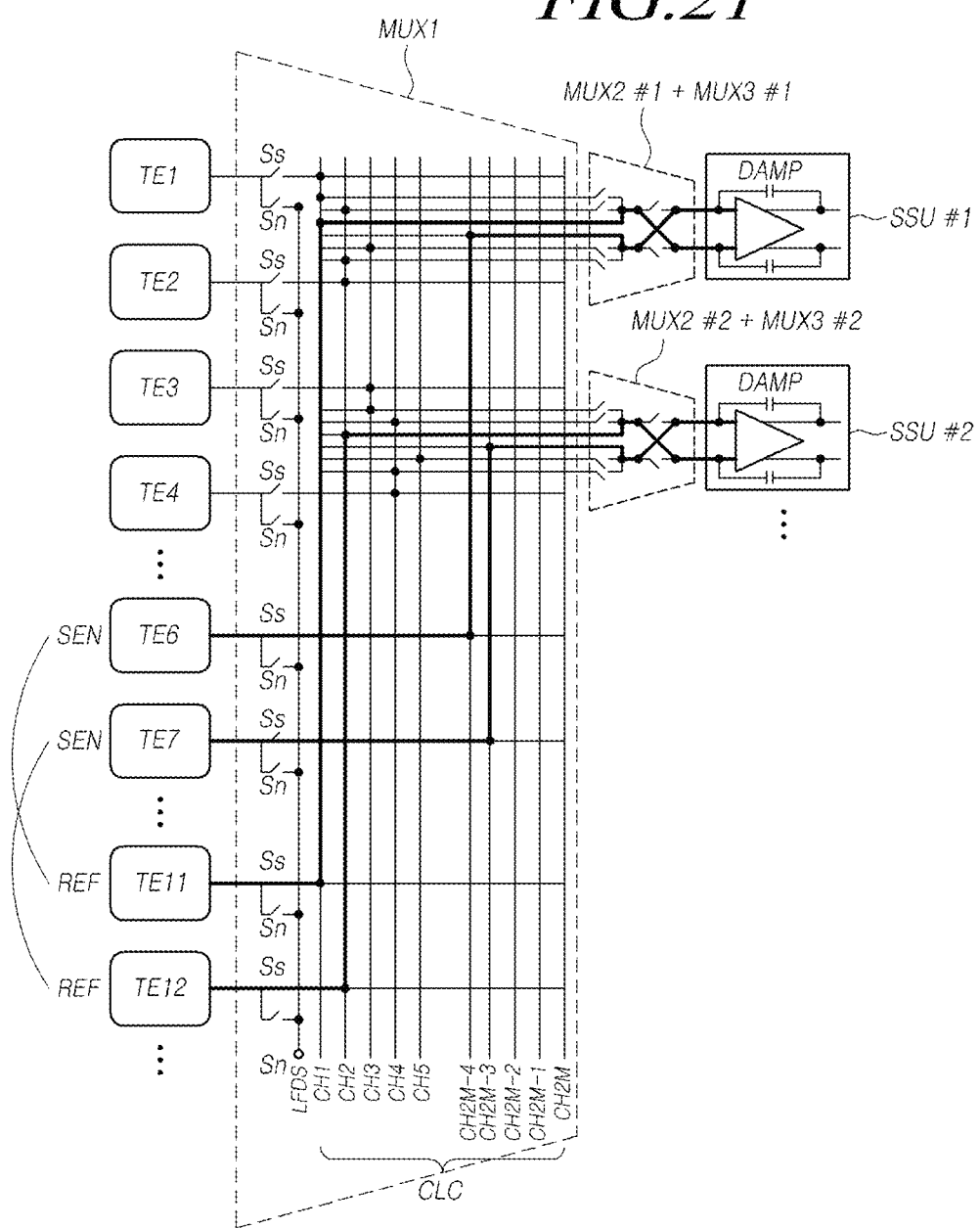
FIG. 21 is a diagram illustrating the operation of a front multiplexer according to the second case of differential sensing according to embodiments of the present disclosure.
Figure 22:
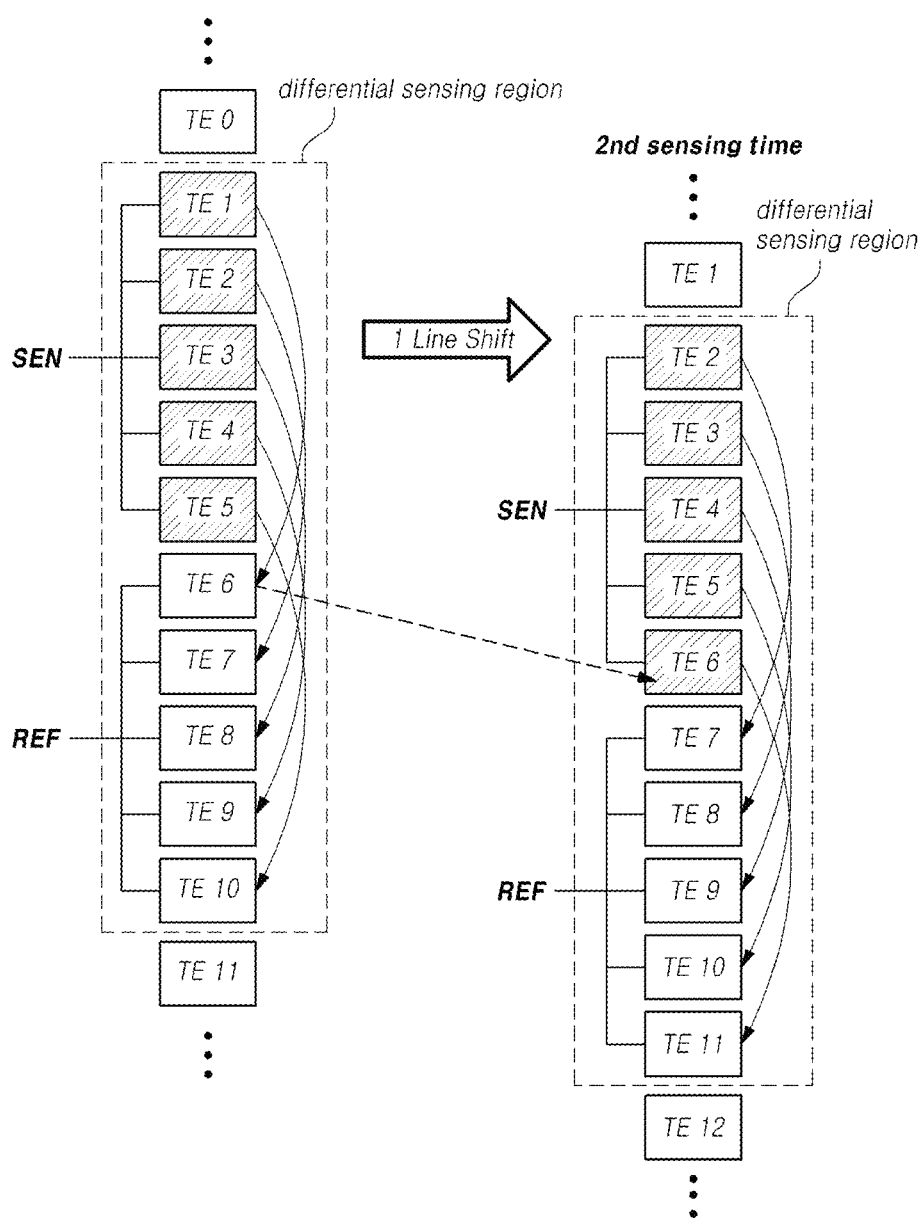
FIG. 22 is a diagram illustrating the operation of a front multiplexer according to the second case of differential sensing according to embodiments of the present disclosure.

FIG. 18 is a diagram illustrating the second case of differential sensing according to embodiments of the present disclosure. FIG. 19 is a diagram illustrating differential sensing during a first sensing time and a second sensing time, in the second case of differential sensing according to embodiments of the present disclosure. FIG. 20 is a diagram illustrating the operation of a front multiplexer F-MUX during a first sensing time in the second case of differential sensing according to embodiments of the present disclosure, and FIG. 21 is a diagram illustrating the operation of a front multiplexer F-MUX during a first sensing time and a second sensing time in the second case of differential sensing according to embodiments of the present disclosure. FIG. 22 is a diagram illustrating differential sensing during a first sensing time and a second sensing time in the second case of differential sensing according to embodiments of the present disclosure.

Referring to FIG. 18, a first-multiplexer MUX1 may select 10(2M=2*5) touch electrodes (TE 1 to TE 10) among N touch electrodes (TE 1, TE 2, . . . , TE 10, TE 11, TE 12, . . . , and TE N), and may set a differential sensing region.

Here, the differential sensing region may include a sensing active region. That is, the differential sensing region may include a sensing active region where sensing electrodes (SEN; TE 1, TE 3, TE 5, TE 7, and TE 9) are disposed, and regions where reference electrodes (REF; TE 2, TE 4, TE 6, TE 8, and TE 10) are disposed.

Five (M=5) second-multiplexers (MUX2 #1 to MUX2 #5) may group 10(2M) touch electrodes (TE 1 to TE 10) into five (M=5) touch electrode pairs (PAIR #1 to PAIR #5).

In the second case (Case 2), when grouping 10(2M) touch electrodes into five touch electrode pairs (PAIR #1 to PAIR #5), the five second-multiplexers (MUX2 #1 to MUX2 #5) may group two touch electrodes spaced apart from each other into a single touch electrode pair.

For example, a first touch electrode TE 1 and a sixth touch electrode TE 6 which are spaced apart from each other are grouped into a first touch electrode pair PAIR #1. A second touch electrode TE 2 and a seventh touch electrode TE 7 which are spaced apart from each other are grouped into a second touch electrode pair PAIR #2. A third touch electrode TE 3 and an eighth touch electrode TE 8 which are spaced apart from each other are grouped into a third touch electrode pair PAIR #3. A fourth touch electrode TE 4 and a ninth touch electrode TE 9 which are spaced apart from each other are grouped into a fourth touch electrode pair PAIR #4. A fifth touch electrode TE 5 and a tenth touch electrode TE 10 which are spaced apart from each other are grouped into a fifth touch electrode pair PAIR #5.

The M (M=5) third-multiplexers (MUX3 #1 to MUX3 #5) may selectively connect two touch electrodes included in each of the 5 touch electrode pairs (PAIR #1 to PAIR #5) to a sensing input end IN_SEN and a reference input end IN_REF of a differential amplifier DAMP included in each of the M (M=5) sensor sensing units (SSU #1 to SSU #5).

For example, the first touch electrode TE 1 and the sixth touch electrode TE 6 included in the first touch electrode pair PAIR #1 are connected to a first sensor sensing unit (SSU #1). The second touch electrode TE 2 and the seventh touch electrode TE 7 included in the second touch electrode pair PAIR #2 are connected to a second sensor sensing unit SSU #2. The third touch electrode TE 3 and the eighth touch electrode TE 8 included in the third touch electrode pair PAIR #3 are connected to a third sensor sensing unit SSU #3. The fourth touch electrode TE 4 and the ninth touch electrode TE 9 included in the fourth touch electrode pair PAIR #4 are connected to a fourth sensor sensing unit SSU #4. The fifth touch electrode TE 5 and the tenth touch electrode TE 10 included in the fifth touch electrode pair PAIR #5 are connected to a fifth sensor sensing unit SSU #5.

Referring to FIG. 19, in the second case of differential sensing according to embodiments of the present disclosure, a region where the first to tenth touch electrodes (TE 1 to TE 10) are disposed is set to a differential sensing region during the first sensing time, as described with reference to FIG. 18.

During the first sensing time, the first sensor sensing unit SSU #1 may differentially sense (differentially amplify) the first touch electrode TE 1 which corresponds to a sensing electrode SEN, and the sixth touch electrode TE 6 which corresponds to a reference electrode REF. The second sensor sensing unit SSU #2 may differentially sense (differentially amplify) the second touch electrode TE 2 which corresponds to a sensing electrode SEN, and the seventh touch electrode TE 7 which corresponds to a reference electrode REF. The third sensor sensing unit SSU #3 may differentially sense (differentially amplify) the third touch electrode TE 3 which corresponds to a sensing electrode SEN, and the eighth touch electrode TE 8 which corresponds to a reference electrode REF. The fourth sensor sensing unit SSU #4 may differentially sense (differentially amplify) the fourth touch electrode TE 4 which corresponds to a sensing electrode SEN, and the ninth touch electrode TE 9 which corresponds to a reference electrode REF. The fifth sensor sensing unit SSU #5 may differentially sense (differentially amplify) the fifth touch electrode TE 5 which corresponds to a sensing electrode SEN, and the tenth touch electrode TE 10 which corresponds to a reference electrode REF.

During the first sensing time, a touch driving circuit TDC may obtain sensing values associated with the first to fifth touch electrodes (TE 1 to TE 5) corresponding to sensing electrodes SEN, via differential sensing.

During a second sensing time after the first sensing time, according to the second case, a differential sensing region may be set by shifting the differential sensing region of the first sensing time by five lines (i.e., five touch electrode rows). That is, the differential sensing region obtained via shifting by five lines is a region where the six to fifteenth (TE 6 to TE 15) touch electrodes (TE 6 to TE 15) are disposed.

During the second sensing time, the first sensor sensing unit SSU #1 may differentially sense (differentially amplify) the sixth touch electrode TE 6 which corresponds to a sensing electrode SEN, and an eleventh touch electrode TE 11 which corresponds to a reference electrode REF. The second sensor sensing unit SSU #2 may differentially sense (differentially amplify) the seventh touch electrode TE 7 which corresponds to a sensing electrode SEN, and a twelfth touch electrode TE 12 which corresponds to a reference electrode REF. The third sensor sensing unit SSU #3 may differentially sense (differentially amplify) the eighth touch electrode TE 8 which corresponds to a sensing electrode SEN, and a thirteenth touch electrode TE 13 which corresponds to a reference electrode REF. The fourth sensor sensing unit SSU #4 may differentially sense (differentially amplify) the ninth touch electrode TE 9 which corresponds to a sensing electrode SEN, and a fourteenth touch electrode TE 14 which corresponds to a reference electrode REF. The fifth sensor sensing unit SSU #5 may differentially sense (differentially amplify) the tenth touch electrode TE 10 which corresponds to a sensing electrode SEN, and a fifteenth touch electrode TE 15 which corresponds to a reference electrode REF.

During the second sensing time, a touch driving circuit TDC may obtain sensing values associated with the sixth to tenth touch electrodes (TE 6 to TE 10) corresponding to sensing electrodes SEN, via differential sensing.

The sixth to tenth touch electrodes (TE 6 to TE 10) correspond to reference electrodes REF during the first sensing time, and correspond to sensing electrodes SEN during the second sensing time. Therefore, polarity reversal of the sixth to tenth touch electrodes (TE 6 to TE 10) may be performed by a corresponding third-multiplexer (MUX3 #j).

Referring to FIG. 20, to briefly describe the multiplexing operation of the front multiplexer F-MUX during the first sensing time in the second case, the first sensor sensing unit SSU #1 may differentially sense (differentially amplify) the first touch electrode TE 1 which corresponds to a sensing electrode SEN, and the sixth touch electrode TE 6 which corresponds to a reference electrode REF.

During the first sensing time, the first-multiplexer MUX1 of the front multiplexer F-MUX may turn on a selection switch Ss which is connected to the first to tenth touch electrodes (TE 1 to TE 10) included in a differential sensing region.

A first second-multiplexer MUX2 #1 corresponding to the first sensor sensing unit SSU #1 may turn on fifth and sixth switches (S5 and S6) used in the second case, among six switches (S1 to S6).

Also, a first third-multiplexer MUX3 #1 corresponding to the first sensor sensing unit SSU #1 may turn on two switches (Sa and Sb) disposed in parallel among four polarity assignment switches (Sa, Sb, Sc, and Sd).

Accordingly, the first sensor sensing unit SSU #1 may be connected to the first touch electrode TE 1 corresponding to a sensing electrode SEN and the sixth touch electrode TE 6 corresponding to a reference electrode REF.

Therefore, the differential amplifier DAMP of the first sensor sensing unit SSU #1 may differentially amplify the first touch electrode TE 1 which corresponds to a sensing electrode SEN, and the sixth touch electrode TE 6 which corresponds to a reference electrode REF.

In the same manner as the above-described multiplexing operation, other touch electrodes included in the differential sensing region during the first sensing time may be electrically connected to a corresponding sensor sensing unit.

Referring to FIG. 21, to briefly describe the multiplexing operation of the front multiplexer F-MUX during the second sensing time after the first sensing time in the second case, the first sensor sensing unit SSU #1 may differentially sense (differentially amplify) the sixth touch electrode TE 6 which corresponds to a sensing electrode SEN, and the eleventh touch electrode TE 11 which corresponds to a reference electrode REF.

During the second sensing time, the first-multiplexer MUX1 of the front multiplexer F-MUX may turn on a selection switch Ss connected to the sixth to fifteenth touch electrodes (TE 6 to TE 15) included in a differential sensing region.

A first second-multiplexer MUX2 #1 corresponding to the first sensor sensing unit SSU #1 may turn on fifth and sixth switches (S5 and S6) used in the second case, among six switches (S1 to S6).

The sixth touch electrode TE 6 is a reference electrode REF at the first sensing time, but changes its function to a sensing electrode SEN at the second sensing time.

Therefore, a first third-multiplexer MUX3 #1 corresponding to the first sensor sensing unit SSU #1 may turn on two switches (Sc and Sd) intersecting each other among four polarity assignment switches (Sa, Sb, Sc, and Sd).

Accordingly, the sixth touch electrode TE 6 changes its function to a sensing electrode SEN. This is referred to as polarity reversal.

Therefore, the first sensor sensing unit SSU #1 may be connected to the sixth touch electrode TE 6 corresponding to a sensing electrode SEN and the eleventh touch electrode TE 11 corresponding to a reference electrode REF.

Therefore, the differential amplifier DAMP of the first sensor sensing unit SSU #1 may differentially amplify the sixth touch electrode TE 6 which corresponds to a sensing electrode SEN, and the eleventh touch electrode TE 11 which corresponds to a reference electrode REF.

In the same manner as the above-described multiplexing operation, other touch electrodes included in the differential sensing region during the second sensing time may be electrically connected to a corresponding sensor sensing unit.

According to the above-described second case, during the second sensing time after the first sensing time, the differential sensing region slides (shifts) by five lines (i.e., five touch electrode rows).

Unlike the above, according to the second case, during the second sensing time after the first sensing time, the differential sensing region may slide (shift) by one line (i.e., one touch electrode row), as illustrated in FIG. 22.

To describe a generalization about shifting (sliding) of a differential sensing region, according to the second case, during the second sensing time after the first sensing time, the differential sensing region may slide (may shift) by one or more lines.

The advantages of the use of the above-described front multiplexer F-MUX will be described with reference to FIGS. 10 to 22.

When display driving and touch driving are performed on the basis of time division, that is, when time-division driving is performed, display driving and touch driving are not affected from each other, a touch may be sensed according to a single sensing scheme (single-ended self-sensing) that separately performs sensing for each touch electrode TE.

That is, in the case of simultaneous driving, when differential sensing is used, noise from display driving may be offset and touch sensitivity may increase. That is, in the case of differential sensing, it is easy to remove common noise (power noise, ground voltage noise, voltages noise related to display driving, and the like).

However, in the case of differential sensing, the following disadvantages may exist.

First, in order to perform sensing of one touch electrode TE, sensing needs to be performed two times. That is, primary differential sensing is performed with respect to a desired touch electrode SEN and a touch electrode REF disposed above the desired touch electrode, and secondary differential sensing is performed with respect to the desired touch electrode SEN and a touch electrode REF disposed below the desired touch electrode. Differential sensing needs to be performed two times since differential sensing senses the difference between sensing signals of touch electrodes TE and performs amplification. Accordingly, sensing is performed two times (differential sensing is performed two times) in order to obtain the absolute value of sensing data (touch raw data).

Second, due to the wiring structure or the like inside a touch driving circuit TDC, a sensing electrode SEN and a reference electrode REF may have different parasitic resistances and different parasitic capacitances. The difference may appear as an offset of sensing data, and may cause a decrease in touch sensitivity.

However, in the case of differential sensing, it is easy to remove common noise (power noise, ground voltage noise, voltages noise related to display driving, and the like).

M second-multiplexers (MUX2 #1 to MUX2 #M) in the above-described front multiplexer F-MUX may determine whether to proceed with the first case (differential sensing of adjacent touch electrodes) or the second case (differential sensing of touch electrodes spaced apart from each other) when performing differential sensing. If the M second-multiplexers (MUX2 #1 to MUX2 #M) are used, in the first case, when differential sensing is performed with respect to one line (one touch electrode row), sensing is performed two times by turning on or off first to fourth switches (S1 to S4). In the second case, a sensing electrode SEN and a reference electrode REF are spaced apart from each other. Although sensing is performed once, a sensing value may be extracted, and thus, the operation may be like a single sensing operation. Therefore, the first drawback of the existing differential sensing scheme may be overcome.

A touch display device may perform sensing according to the first case in which a signal to noise ratio (SNR) is high, during a period for sensing a touch by a finger or for sensing the location of a pen, and may perform sensing according to the second case that performs sensing once even though an SNR is low during a period for receiving pen data.

By disposing the M second-multiplexer (MUX2 #1 to MUX2 #M) to respectively correspond to M sensor sensing units (SSU #1 to SSU #M), the parasitic resistances and the parasitic capacitances of a sensing electrode SEN and a reference electrode REF may be matched up to a differential amplifier DAMP in the touch driving circuit TDC.

Accordingly, an offset of sensing data may be maximally reduced. Therefore, the second drawback of the existing differential sensing scheme may be overcome.

Figure 23:
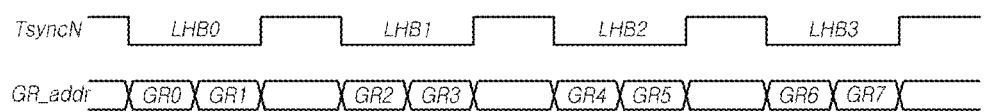
FIG. 23 is a driving timing diagram of a group driving scheme of a touch display device according to embodiments of the present disclosure.
Figure 24:
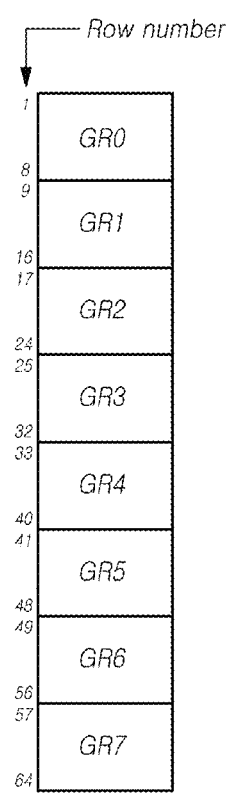
FIG. 24 is a diagram illustrating a group of touch electrodes on the basis of a group driving scheme of a touch display device according to embodiments of the present disclosure.

FIG. 23 is a driving timing diagram of a group driving scheme of a touch display device according to embodiments of the present disclosure. FIG. 24 is a diagram illustrating a group of touch electrodes on the basis of a group driving scheme of a touch display device according to embodiments of the present disclosure.

Referring to FIG. 23, in order to perform touch sensing with respect to the entirety of a touch panel TSP once, a plurality of touch driving periods (LHB0, LHB1, LHB2, LHVB3, . . . , and the like), which are defined and allocated by a touch synchronization signal TsyncN, may begin.

In the case of simultaneous driving, the plurality of touch driving periods (LHB0, LHB1, LHB2, LHVB3, . . . , and the like) may be periods in which display driving is performed.

In the case of time-division driving, the plurality of touch driving periods (LHB0, LHB1, LHB2, LHVB3, . . . , and the like) may be blank periods between display driving periods.

Referring to FIG. 23, all touch electrodes TE disposed in the touch panel TSP may be grouped into a plurality of groups (GR0, GR1, GR2, GR3, . . . , and the like).

Referring to the example of FIG. 24, each of the plurality of groups (GR0, GR1, GR2, GR3, . . . , and the like) includes eight touch electrode rows (hereinafter, referred to as rows), 64 rows may be grouped into eight groups (GR0 to GR7).

The plurality of groups (GR0, GR1, GR2, GR3, . . . , and the like) may be allocated to the plurality of touch driving periods (LHB0, LHB1, LHB2, LHVB3, . . . , and the like), and touch driving may be performed.

For example, during the first touch driving period LHB0, touch driving of the first group GR0 and the second group GR1 is performed. During the second touch driving period LHB1, touch driving of the third group GR3 and the fourth group GR4 is performed. During the third touch driving period LHB2, touch driving of the fifth group GR4 and the sixth group GR5 is performed. During the fourth touch driving period LHB3, touch driving of the seventh group GR6 and the eight group GR7 is performed. The matching information between the plurality of touch driving periods (LHB0, LHB1, LHB2, LHVB3, . . . , and the like) and the plurality of groups (GR0, GR1, GR2, GR3, . . . , and the like) may be represented by the group information signal GR_addr. The touch controller TCTR or the display controller DCTR may output the group information signal GR_addr to the touch driver circuit TDC.

Referring to FIGS. 23 and 24, during the first half of the first touch driving period LHB0, the first group GR0 may be activated as a sensing active region. In this instance, touch electrodes TE disposed in first to eighth rows (row numbers: 1 to 8) included in the first group GR0 may be sensed. Subsequently, during the second half of the first touch driving period LHB0, the second group GR1 may be activated as a sensing active region. In this instance, touch electrodes TE disposed in ninth to sixteenth rows (row numbers: 9 to 16) included in the second group GR1 may be sensed In this manner, sensing may be performed during the second to eighth touch driving periods (LHB1 to LHB7).

In this manner, eight groups (GR0 to GR7) are sequentially activated as a sensing active region. In order to detect touch coordinates, the period of time corresponding to the sum of sensing time of each of the eight groups (GR0 to GR7) may be spent, and thus, a large amount of time and delay may be caused in order to detect the touch coordinates.

Also, referring to FIG. 23, when a touch occurs at the boundary between adjacent groups (e.g., GR3 and GR4) and the fourth group GR3 is activated as a sensing active region, only the part corresponding to the fourth group GR3 is sensed and the part corresponding to the fifth group GR4 is not sensed. Also, when the fifth group GR4 is activated as a sensing active region, only the part corresponding to the fifth group GR4 is sensed and the part corresponding to the fourth group GR3 is not sensed.

The drawbacks are caused since the locations of the plurality of groups (GR0 to GR7) which may be activated as sensing active regions are fixed, and each of the plurality of groups (GR0 to GR7) includes a plurality of rows (touch electrode rows).

Accordingly, the front-multiplexer F-MUX in the touch driving circuit TDC according to embodiments of the present disclosure may adaptively set a sensing active region. That is, the front-multiplexer F-MUX may adaptively change a start (a start row) of the sensing active region.

FIGS. 25A to 25F are diagrams illustrating various examples of a sensing active region TENA for touch driving of a touch display device according to embodiments of the present disclosure.

As illustrated in FIGS. 25A to 25F, the start (the start row) of a sensing active region TENA during a single sensing time, is not fixed, but may vary.

Particularly, the sensing active region TENA may include H touch electrode rows from among a plurality of touch electrode rows disposed in a touch panel TSP. Here, H is greater than or equal to 2, and H is 8 in the examples of FIG. 25A to FIG. 25F.

The front multiplexer F-MUX may change a first touch electrode row of the sensing active region TENA in units of rows, as opposed to units of fixed groups.

Figure 25A:
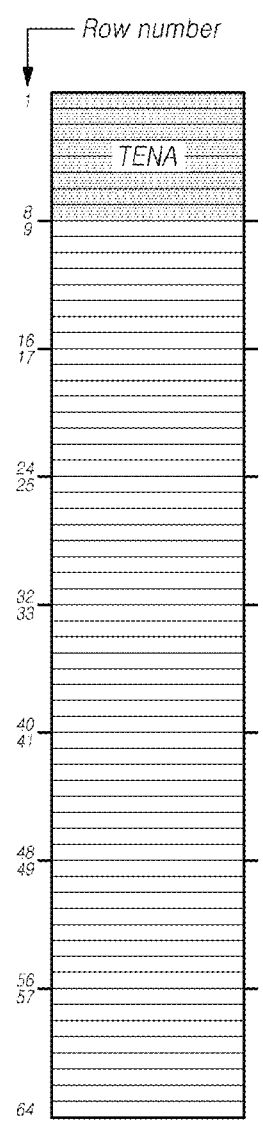
FIG. 25A to 25F are diagrams illustrating various examples of a sensing active region for touch driving of a touch display device according to embodiments of the present disclosure.

In FIG. 25A, the first touch electrode row of the sensing active region TENA is the first row.

Figure 25B:
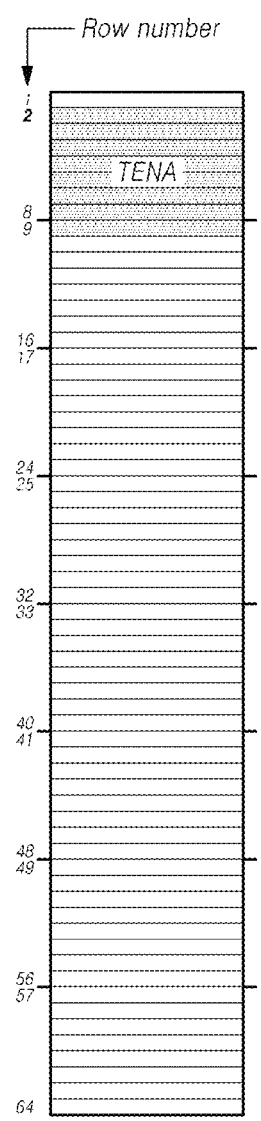

In FIG. 25B, the first touch electrode row of the sensing active region TENA is the second row.

Figure 25C:
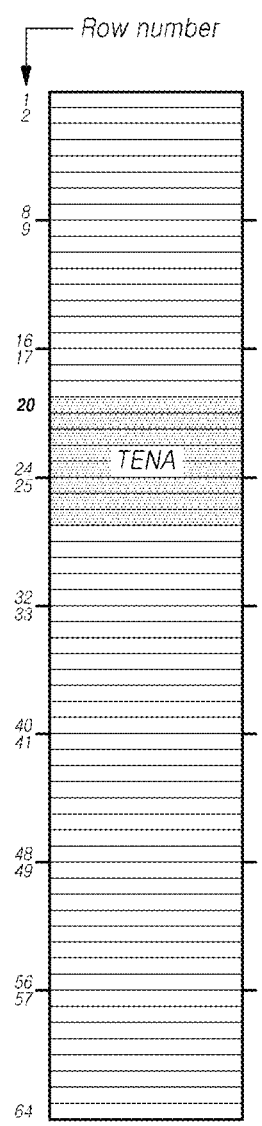

In FIG. 25C, the first touch electrode row of the sensing active region TENA is the twentieth row.

Figure 25D:
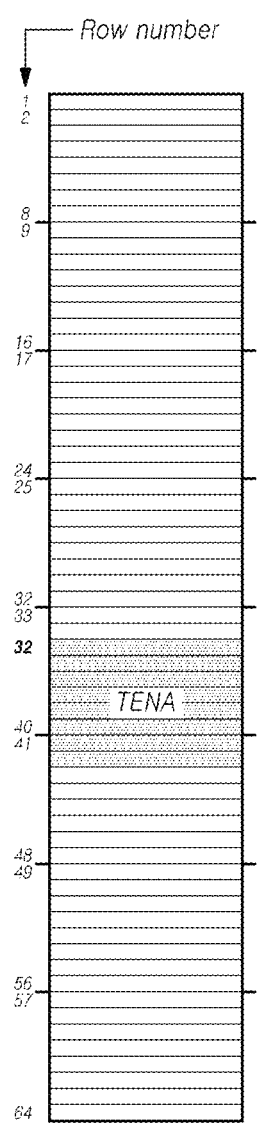

In FIG. 25D, the first touch electrode row of the sensing active region TENA is the thirty second row.

Figure 25E:
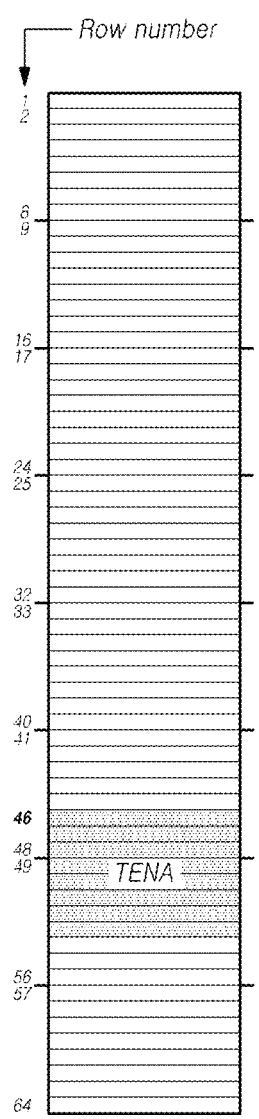

In FIG. 25E, the first touch electrode row of the sensing active region TENA is the forty sixth row.

Figure 25F:
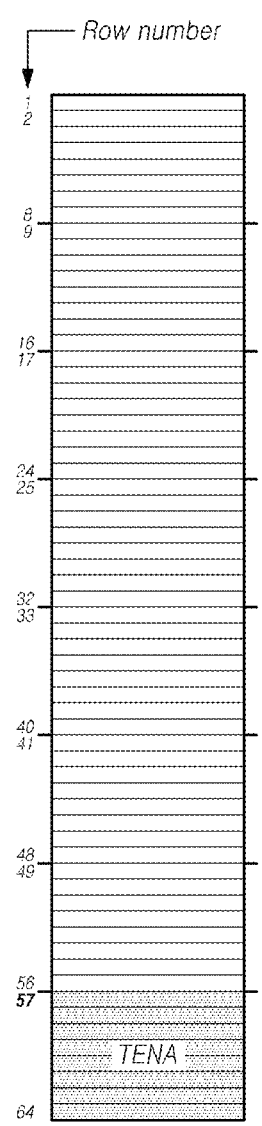

In FIG. 25F, the first touch electrode row of the sensing active region TENA is the fifty seventh row.

Figure 26:
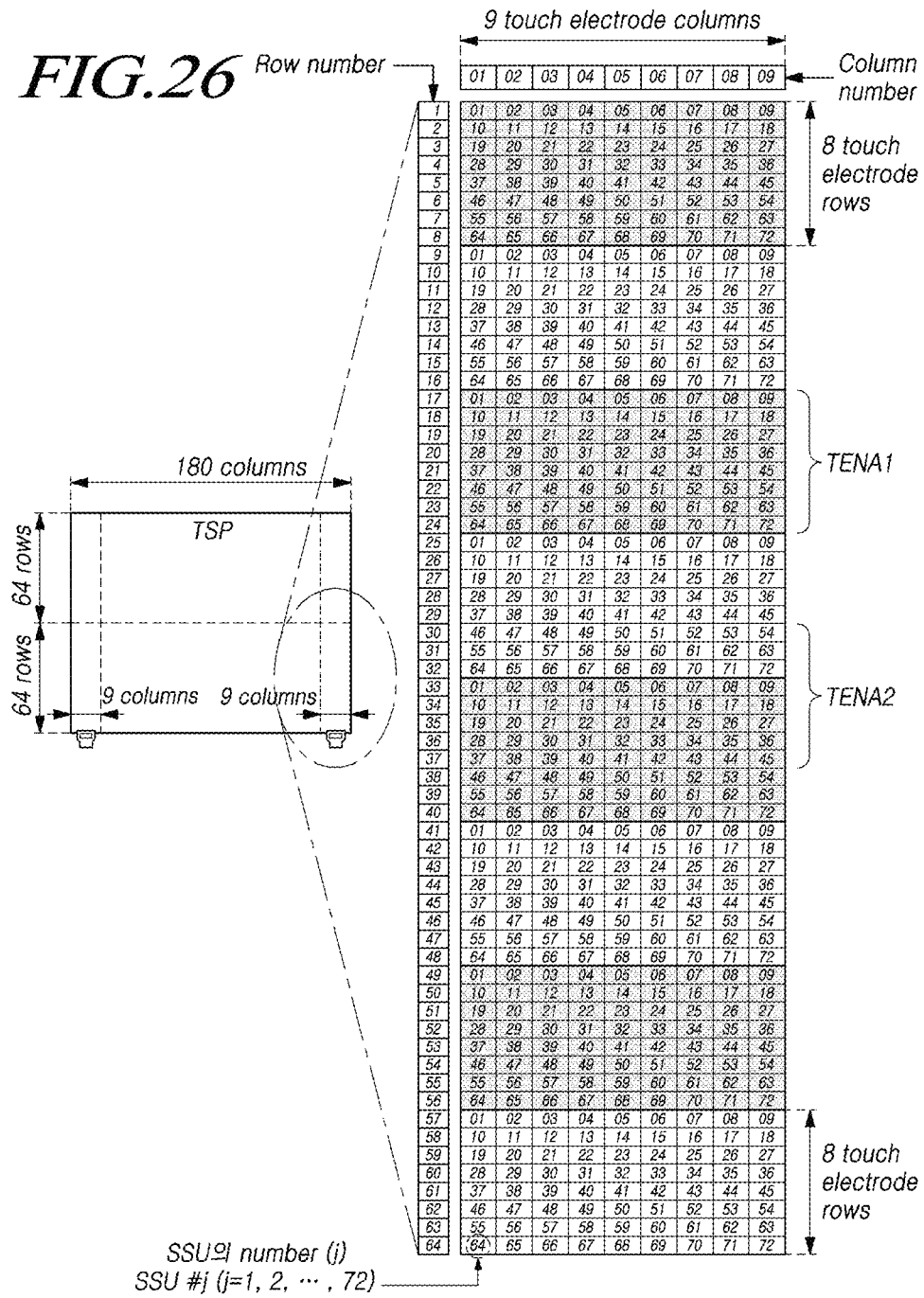
FIG. 26 is a diagram illustrating a matching relationship between touch electrodes and sensor sensing units, in a touch display device according to embodiments of the present disclosure.
Figure 27:
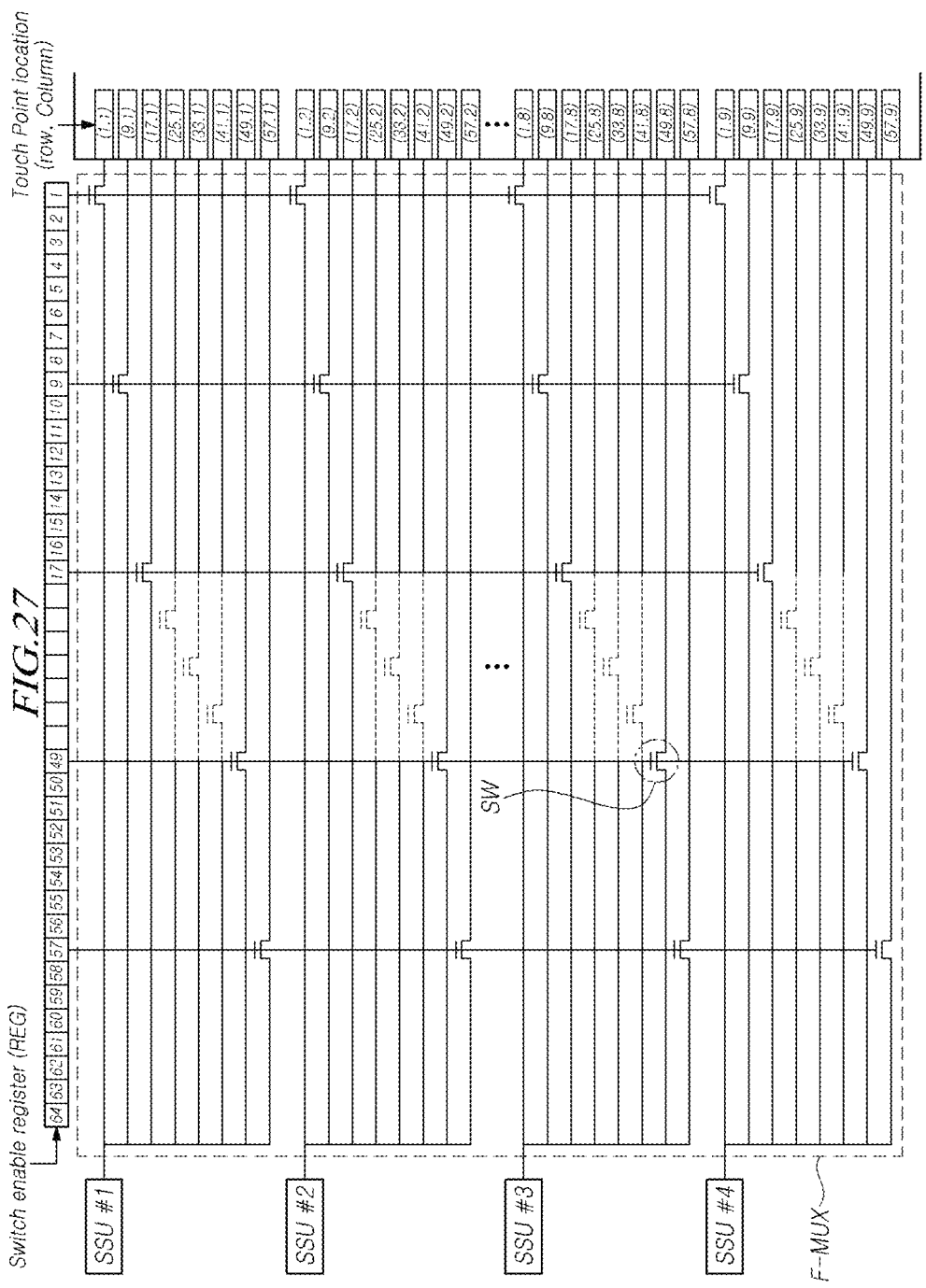
FIG. 27 is a diagram illustrating an adaptive front multiplexer in a touch display device according to embodiments of the present disclosure.
Figure 28:
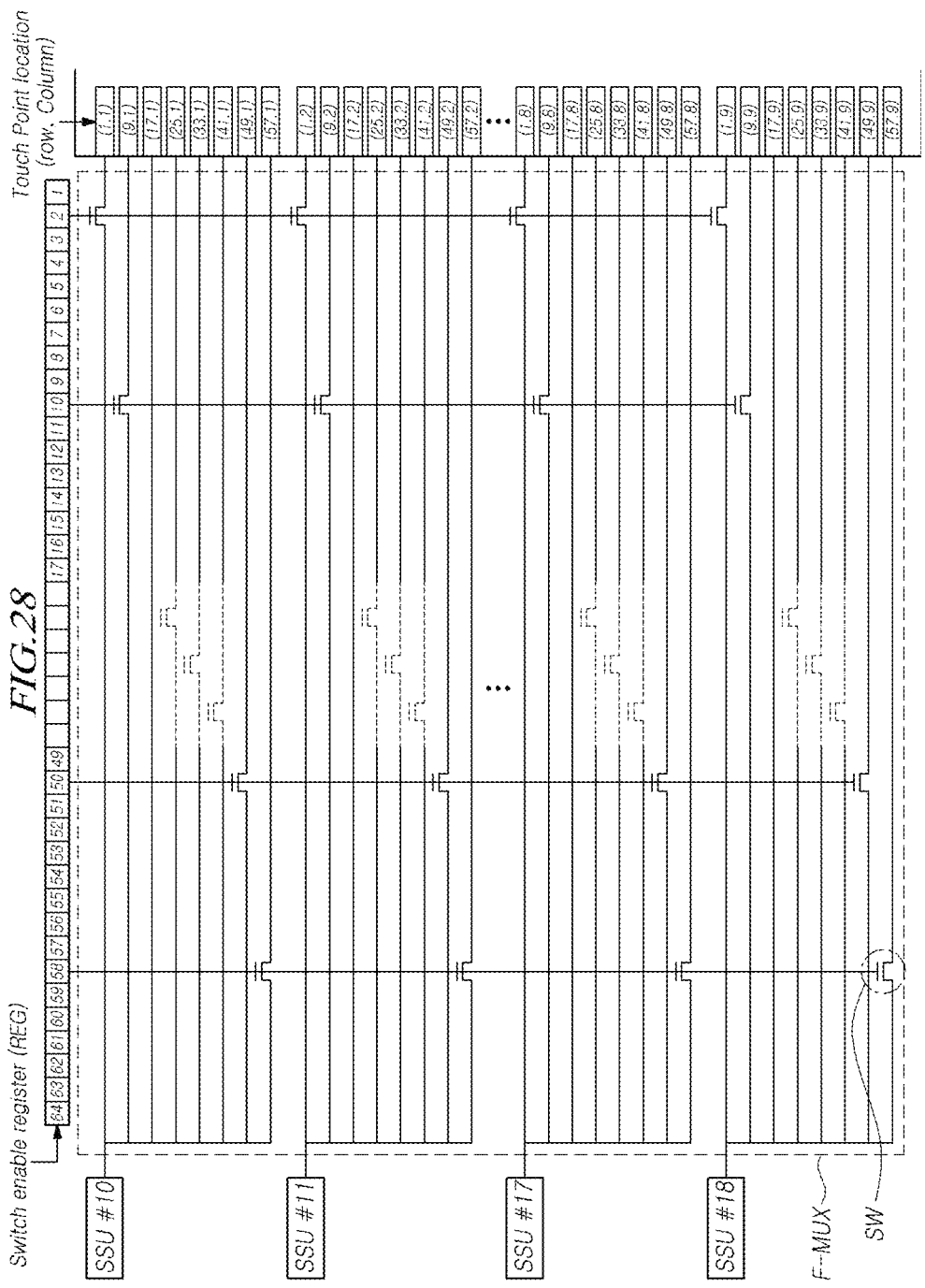
FIG. 28 is a diagram illustrating an adaptive front multiplexer in a touch display device according to embodiments of the present disclosure.
Figure 29:
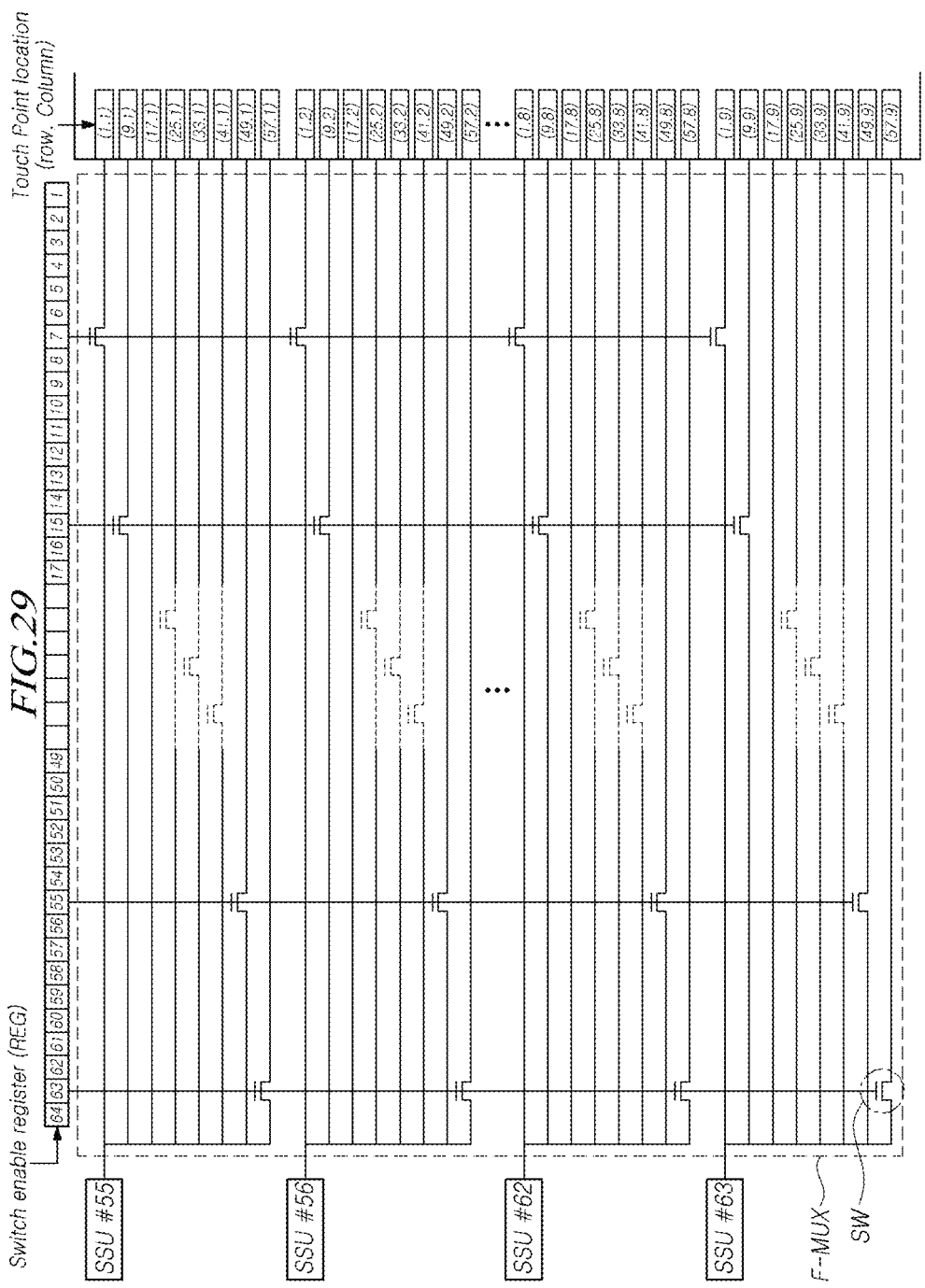
FIG. 29 is a diagram illustrating an adaptive front multiplexer in a touch display device according to embodiments of the present disclosure.
Figure 30:
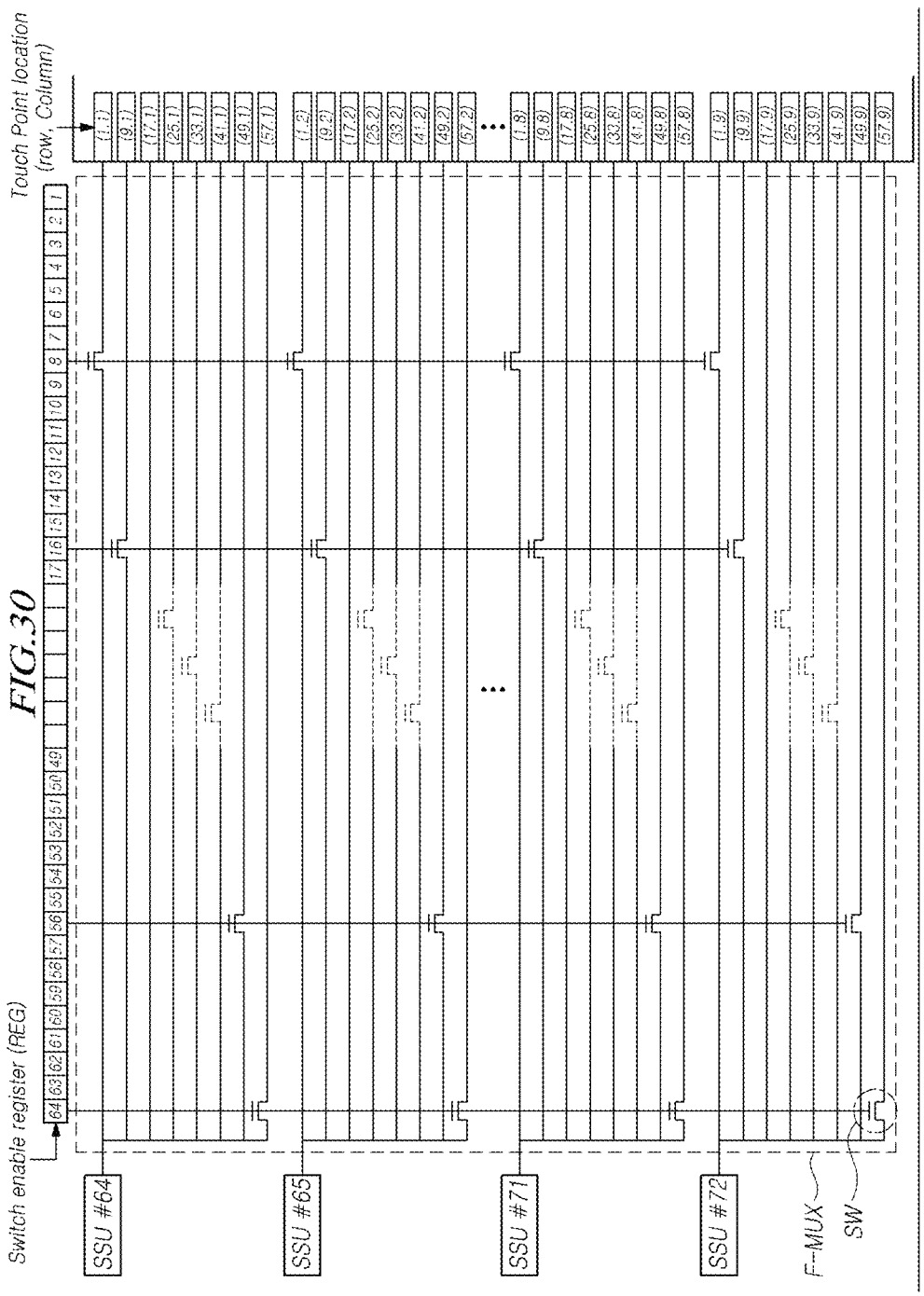
FIG. 30 is a diagram illustrating an adaptive front multiplexer in a touch display device according to embodiments of the present disclosure.

FIG. 26 is a diagram illustrating a matching relationship between touch electrodes and sensor sensing units, in a touch display device according to embodiments of the present disclosure. FIG. 27 is a diagram illustrating an adaptive front multiplexer F-MUX in a touch display device according to embodiments of the present disclosure, FIG. 28 is a diagram illustrating an adaptive front multiplexer F-MUX in a touch display device according to embodiments of the present disclosure, FIG. 29 is a diagram illustrating an adaptive front multiplexer F-MUX in a touch display device according to embodiments of the present disclosure, and FIG. 30 is a diagram illustrating an adaptive front multiplexer F-MUX in a touch display device according to embodiments of the present disclosure.

Referring to FIG. 26, as described above, to change the first touch electrode row of the sensing active region TENA in units of rows, as opposed to units of fixed groups, the front multiplexer F-MUX may need to match touch electrodes TE and sensor sensing units (SSU #j, j=1, 2, . . . , and 72). That is, the sensor sensing units (SSU #j, j=1, 2, . . . , 72) may be matched on the basis of the coordinates of touch electrodes TE.

The coordinates of each of the touch electrodes TE may be defined by the pair of the row number and the column number of each of the touch electrodes TE (coordinates= (row number, column number)). Each of the sensor sensing units (SSU #j, j=1, 2, 72) may be defined by a unique identification number (j).

FIG. 26 is a diagram illustrating a matching relationship associated with a part where touch electrodes are disposed in 64 rows and 9 columns when touch electrodes TE are disposed in 128 rows and 180 columns in the touch panel TSP. Hereinafter, for ease of description, the part where touch electrodes TE are disposed in 64 rows and 9 columns will be described.

Referring to FIG. 26, the number of touch electrodes which may be connected to each of M sensor sensing units (SSU #1 to SSU #M) at different times may be K(=N/M).

According to the example of FIG. 26, M, which is the number of sensor sensing units, is 72, and N, which is the number of touch electrodes, is 576(=64*9). Therefore, K, which is the number of touch electrodes which may be connected to a single sensor sensing unit, may be 8(=576/72).

Referring to FIGS. 27 to 30, the front multiplexer F-MUX may include switch elements SW for connecting one of the K touch electrodes, which are connectable to each of the M sensor sensing units (SSU #1 to SSU #M), to a corresponding sensor sensing unit. In FIGS. 27 to 30, the location of a touch point may correspond to the location of a touch electrode.

For example, a first sensor sensing unit SSU #1 may be connected to eight (K=8) touch electrodes disposed at coordinates (1, 1), (9, 1), (17, 1), (25, 1), (33, 1), (41, 1), (49, 1) and (57, 1), at different times (different sensing times), via eight switch elements SW.

As another example, a second sensor sensing unit SSU #2 may be connected to eight (K=8) touch electrodes disposed at coordinates (1, 2), (9, 2), (17, 2), (25, 2), (33, 2), (41, 2), (49, 2) and (57, 2), at different times (different sensing times), via eight switch elements SW.

As another example, the third sensor sensing unit SSU #3 may be connected to eight (K=8) touch electrodes disposed at coordinates (1, 3), (9, 3), (17, 3), (25, 3), (33, 3), (41, 3), (49, 3) and (57, 3), at different times (different sensing times), via eight switch elements SW.

In this manner, each of the 72 (M=72) sensor sensing units (SSU #1 to SSU #72) may be matched to eight touch electrodes.

Referring to FIGS. 27 to 30, the front multiplexer F-MUX may turn on some of the switch elements SW on the basis of register values stored in a switch enable register (REG).

The switch enable register (REG) may store register values corresponding to 64 rows.

The switch enable register (REG) may exist inside or outside a touch driving circuit TDC or a touch controller TCTR.

The register values stored in the switch enable register (REG) may be set by the touch driving circuit TDC or a touch controller TCTR.

For example, the first sensor sensing unit SSU #1 will be described.

Among the register values stored in the switch enable register (REG), $1^{st}$, $9^{th}$, $17^{th}$, $25^{th}$, $33^{rd}$, $41^{st}$, $49^{th}$, and $57^{th}$ register values corresponding to the first sensor sensing unit SSU #1 may be set to a turn-on value for turning on switch elements SW and a turn-off value for turning off the switch elements SW at a proper timing of a sensing time.

That is, during a predetermined sensing time, one of the $1^{st}$, $9^{th}$, $17^{th}$, $25^{th}$, $33^{rd}$, $41^{st}$, $49^{th}$, and $57^{th}$ register values is set to a turn-on value and the rest of register values are set to a turn-off value.

Depending on the $1^{st}$, $9^{th}$, $17^{th}$, $25^{th}$, $33^{rd}$, $41^{st}$, $49^{th}$, and $57^{th}$ register values, one of the eight switch elements SW corresponding to the first sensor sensing unit SSU #1 is turned on and the remaining seven switch elements are turned off, from among 576 switch elements SW included in the front multiplexer F-MUX.

The touch driving circuit TDC set the gate voltage of eight switch elements SW to a turn-on level voltage, and turns on the eight switch elements SW, on the basis of the $1^{st}$, $9^{th}$, $17^{th}$, $25^{th}$, $33^{rd}$, $41^{st}$, $49^{th}$, and $57^{th}$ register values.

As described above, the front multiplexer F-MUX may change the location of the first touch electrode row of the sensing active region TENA in units of rows, using the switch enable register (REG).

The front multiplexer F-MUX may change the location of the first touch electrode row of the sensing active region TENA in units of rows when the register values stored in the switch enable register (REG) are updated.

Therefore, as illustrated in FIG. 26, a first sensing active region TENA1 which starts from the $17^{th}$ row may be set for one sensing time, and a second sensing active region TENA2 which starts from the 30th row may be set for another sensing time.

Figure 31:
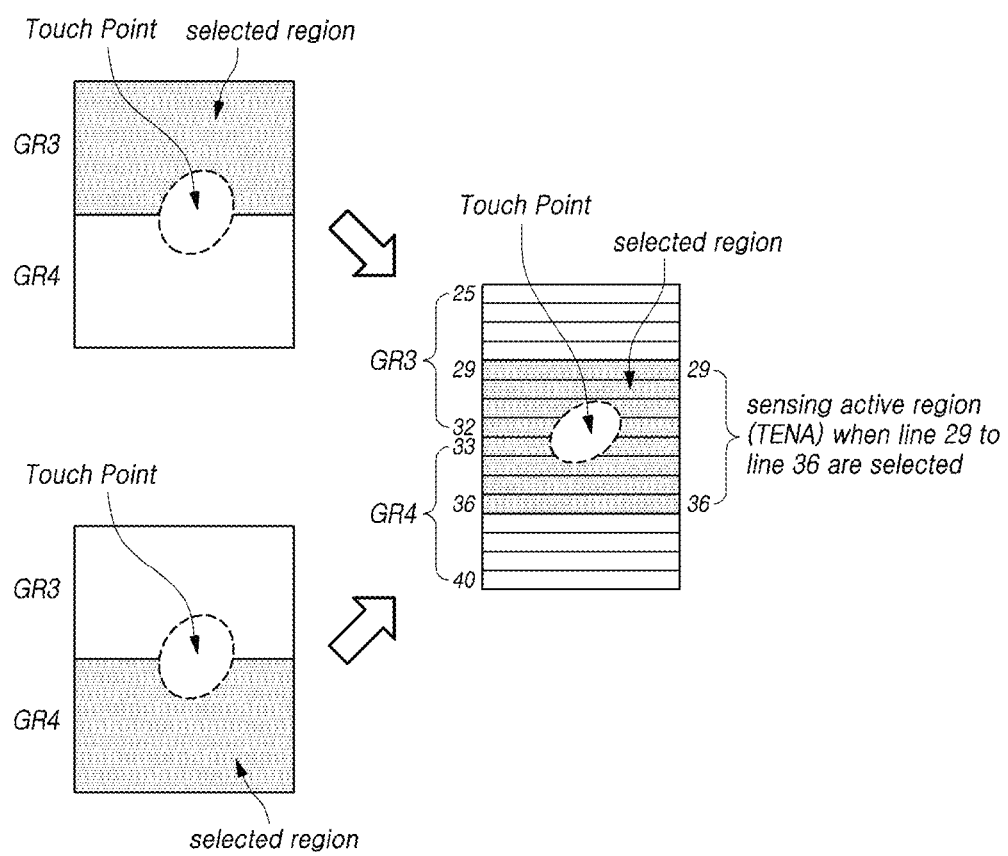
FIG. 31 is a diagram illustrating effects of the use of an adaptive front multiplexer in a touch display device according to embodiments.

FIG. 31 is a diagram illustrating effects of the use of an adaptive front multiplexer F-MUX in a touch display device according to embodiments of the present disclosure.

The above-described front multiplexer F-MUX may change the first touch electrode row of a sensing active region TENA in units of rows, as opposed to units of fixed groups, and the sensing active region TENA may be adaptively changed and set.

By adaptively changing the sensing active region TENA, the location where a touch occurs can be always included in the sensing active region TENA.

When a touch occurs at the boundary between adjacent groups (e.g., GR 3 and GR 4) and a fourth group GR3 is activated as a sensing active region, only the part corresponding to the fourth group GR3 is sensed and the part corresponding to a fifth group GR4 is not sensed. When the fifth group GR4 is activated as a sensing active region, only the part corresponding to the fifth group GR4 is sensed, and the part corresponding to the fourth group GR3 is not sensed. The drawback may be overcome as illustrated in FIG. 31.

Figure 32:
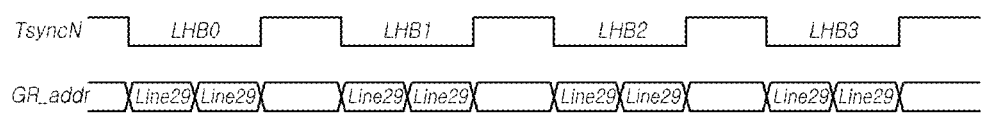
FIG. 32 is a diagram illustrating an example of touch driving that utilizes an adaptive front multiplexer in a touch display device according to embodiments of the present disclosure.

FIG. 32 is a diagram illustrating an example of touch driving that utilizes an adaptive front multiplexer F-MUX in a touch display device according to embodiments of the present disclosure.

Referring to FIG. 32, the front multiplexer F-MUX may continuously select a touch electrode row (e.g., line 29) corresponding to a certain location during a plurality of touch driving periods (LHB0 to LHB3). Accordingly, a touch driving circuit TDC may continuously sense the same touch electrode row (e.g., line 29) without a delay.

The touch electrode row (e.g., line 29) matching the plurality of touch driving periods (LHB0 to LHB3) may be represented by the group information signal GR_addr. The touch controller TCTR or the display controller DCTR may output the group information signal GR_addr to the touch driver circuit TDC.

According to the above-described embodiments, there may be provided a front multiplexer F-MUX that enables effective touch driving, a touch display device including the front multiplexer F-MUX, and a touch driving circuit TDC.

Also, according to embodiments, there may be provided a front multiplexer F-MUX that enables simultaneous sensing of touch electrodes disposed in a predetermined region (sensing active region or differential sensing region) during one sensing time, a touch display device including the front multiplexer F-MUX, and a touch driving circuit TDC.

Also, according to embodiments, there may be provided a front multiplexer F-MUX that enables effective and various changes of a region (sensing active region or differential sensing region) which may be simultaneously sensed according to a sensing time, a touch display device including the front multiplexer F-MUX, and a touch driving circuit TDC.

According to embodiments, there may be provided a front multiplexer F-MUX suitable for a differential sensing scheme, a touch display device including the front multiplexer F-MUX, and a touch driving circuit TDC.

According to embodiments, there may be provided a front multiplexer F-MUX suitable for a simultaneous driving scheme that simultaneously performs display driving and touch driving, a touch display device including the front multiplexer F-MUX, and a touch driving circuit TDC.

According to embodiments, there may be provided a front multiplexer F-MUX that may change, in units of lines, a region which may be simultaneously sensed according to a sensing time, a touch display device including the front multiplexer F-MUX, and a touch driving circuit TDC.

It will be apparent to those skilled in the art that various modifications and variations can be made in the touch display device and the touch driving circuit of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
a touch panel comprising N touch electrodes;
a sensor sensing unit block configured to sense two or more touch electrodes among the N touch electrodes; and
a front multiplexer configured to select the two or more touch electrodes among the N touch electrodes and connect the selected touch electrodes to the sensor sensing unit block,
wherein the sensor sensing unit block comprises M sensor sensing units, M is greater than or equal to 2, and N is greater than M,
wherein the front multiplexer is configured to select M touch electrodes, which are disposed in a sensing active region corresponding to a first sensing period, from among the N touch electrodes, and to match and connect the M touch electrodes to the M sensor sensing units,
wherein the M sensor sensing units are configured to simultaneously sense the M touch electrodes disposed in the sensing active region during the first sensing period, and
wherein the front multiplexer comprises:
a first-multiplexer configured to select the 2M touch electrodes from among the N touch electrodes, and to set a differential sensing region;
M second-multiplexers corresponding to the M sensor sensing units, and configured to group the 2M touch electrodes into M touch electrode pairs; and
M third-multiplexers corresponding to the M sensor sensing units, and configured to selectively connect two touch electrodes included in each of the M touch electrode pairs to a sensing input end and a reference input end of a differential amplifier included in each of the M sensor sensing units.

2. The touch display device of claim 1, wherein each of the M sensor sensing units comprises a differential amplifier having a sensing input end and a reference input end,
the front multiplexer is configured to:
select the M touch electrodes disposed in the sensing active region from among the N touch electrodes, as M sensing electrodes;
further select other M touch electrodes from among N-M touch electrodes remaining after excluding the M touch electrodes from the N touch electrodes, as M reference electrodes;
connect each of the M sensing electrodes to a sensing input end of the differential amplifier of each of the M sensor sensing units; and
connect each of the M reference electrodes to a reference input end of the differential amplifier of each of the M sensor sensing units, and the differential amplifier of each of the M sensor sensing units differentially amplifies a first input signal and a second input signal, which are input from a corresponding sensing electrode and a corresponding reference electrode, respectively.

3. The touch display device of claim 2, wherein the first-multiplexer is configured to: select the 2M touch electrodes from among the N touch electrodes, and to provide a load-free driving signal to touch electrodes remaining after excluding the 2M touch electrodes from the N touch electrodes.

4. The touch display device of claim 2, wherein, when grouping the 2M touch electrodes into the M touch electrode pairs, the M second-multiplexers group two touch electrodes, disposed to be adjacent to each other, into a single touch electrode pair.

5. The touch display device of claim 2, wherein, when grouping the 2M touch electrodes into the M touch electrode pairs, the M second-multiplexers group two touch electrodes, disposed to be spaced apart from each other, into a single touch electrode pair.

6. The touch display device of claim 2, wherein each of the M second-multiplexers comprises:
a first switch and a second switch which group a first touch electrode and a second touch electrode adjacent to the first touch electrode, at a first sensing timing; and
a third switch and a fourth switch which group the second touch electrode and a third touch electrode adjacent to the second touch electrode, at a second sensing timing.

7. The touch display device of claim 2, wherein each of the M second-multiplexers comprises a fifth switch and a sixth switch which group a first touch electrode and a second touch electrode which is spaced one or more touch electrodes apart from the first touch electrode.

8. The touch display device of claim 2, wherein each of the M third-multiplexers comprises four polarity assignment switches which selectively connect two touch electrodes included in each of the M touch electrode pairs to a sensing input end and a reference input end of a differential amplifier of a corresponding sensor sensing unit.

9. The touch display device of claim 1, wherein the touch panel comprises a plurality of touch electrode rows,
the sensing active region comprises H touch electrode rows from among the plurality of touch electrode rows, and
the front multiplexer changes a first touch electrode row of the sensing active region in units of rows.

10. The touch display device of claim 9, wherein the front multiplexer comprises:
switch elements configured to connect one of K touch electrodes, which are connectable to each of the M sensor sensing units, to a corresponding sensor sensing unit, and
K is a number of touch electrodes which are connectable to each of the M sensor sensing units at different points in time, and is equal to N/M.

11. The touch display device of claim 10, wherein the front multiplexer turns on some of the switch elements on the basis of register values stored in a switch enable register.

12. The touch display device of claim 11, wherein the front multiplexer changes a location of a first touch electrode row of the sensing active region in units of rows in response to updating of the register values stored in the switch enable register.

13. The touch display device of claim 1, wherein the sensing active region is changed in units of rows such that a touch occurrence location is included in the sensing active region.

14. A touch driving circuit, comprising:
a sensor sensing unit block configured to sense two or more touch electrodes from among N touch electrodes included in a touch panel; and
a front multiplexer configured to select two or more touch electrodes from among the N touch electrodes, and to connect the two or more touch electrodes to the sensor sensing unit block, wherein the sensor sensing unit block comprises M sensor sensing units, M is greater than or equal to 2, and N is greater than M, wherein the front multiplexer is configured to select M touch electrodes disposed in a sensing active region corresponding to a first sensing period from among the N touch electrodes, and to match and connect the M touch electrodes and the M sensor sensing units, wherein the M sensor sensing units are configured to simultaneously sense the M touch electrodes disposed in the sensing active region during the first sensing period, and wherein the front multiplexer comprises:
- a first-multiplexer configured to select the 2M touch electrodes from among the N touch electrodes, and to set a differential sensing region;
- M second-multiplexers corresponding to the M sensor sensing units, and configured to group the 2M touch electrodes into M touch electrode pairs; and
- M third-multiplexers corresponding to the M sensor sensing units, and configured to selectively connect two touch electrodes included in each of the M touch electrode pairs to a sensing input end and a reference input end of a differential amplifier included in each of the M sensor sensing units.

15. The touch driving circuit of claim 14, wherein each of the M sensor sensing units comprises a differential amplifier having a sensing input end and a reference input end, the front multiplexer is configured to:
- select the M touch electrodes disposed in the sensing active region from among the N touch electrodes, as M sensing electrodes;
- further select M other touch electrodes from among N-M touch electrodes remaining after excluding the M touch electrodes from the N touch electrodes;
- connect each of the M sensing electrodes to a sensing input end of the differential amplifier of each of the M sensor sensing units; and
- connect each of the M reference electrode to a reference input end of the differential amplifier of each of the M sensor sensing units, and the differential amplifier of each of the M sensor sensing units differentially amplifies a first input signal and a second input signal which are input from a corresponding sensing electrode and a corresponding reference electrode, respectively.

16. The touch driving circuit of claim 14, wherein the sensing active region comprises H touch electrode rows from among a plurality of touch electrode rows included in the touch panel, and the front multiplexer changes a first touch electrode row of the sensing active region in units of rows.

17. The touch driving circuit of claim 16, wherein the front multiplexer changes a location of a first touch electrode row of the sensing active region in units of rows, using a switch enable register.

* * * * *